United States Patent
Nishibe

(10) Patent No.: US 11,615,767 B2
(45) Date of Patent: Mar. 28, 2023

(54) INFORMATION PROCESSING APPARATUS, INFORMATION PROCESSING METHOD, AND RECORDING MEDIUM

(71) Applicant: SONY GROUP CORPORATION, Tokyo (JP)

(72) Inventor: Mitsuru Nishibe, Chiba (JP)

(73) Assignee: Sony Group Corporation, Tokyo (JP)

( * ) Notice: Subject to any disclaimer, the term of this patent is extended or adjusted under 35 U.S.C. 154(b) by 53 days.

(21) Appl. No.: 17/284,303

(22) PCT Filed: Oct. 8, 2019

(86) PCT No.: PCT/JP2019/039610
§ 371 (c)(1),
(2) Date: Apr. 9, 2021

(87) PCT Pub. No.: WO2020/080177
PCT Pub. Date: Apr. 23, 2020

(65) Prior Publication Data
US 2021/0390928 A1    Dec. 16, 2021

(30) Foreign Application Priority Data

Oct. 16, 2018   (JP) .............................. JP2018-195198

(51) Int. Cl.
*G09G 5/38* (2006.01)
*G06T 19/00* (2011.01)
(Continued)

(52) U.S. Cl.
CPC ............... *G09G 5/38* (2013.01); *G06F 3/012* (2013.01); *G06T 13/20* (2013.01); *G06T 15/20* (2013.01);
(Continued)

(58) Field of Classification Search
CPC ....................................................... G09G 5/38
(Continued)

(56) References Cited

U.S. PATENT DOCUMENTS

2016/0282619 A1* 9/2016 Oto ......................... G06F 3/012
2019/0049728 A1* 2/2019 Oto ......................... A63F 13/25
(Continued)

FOREIGN PATENT DOCUMENTS

| JP | 2015-095045 A | 5/2015 |
| JP | 2018-525693 A | 9/2018 |
| WO | WO 2017/183346 A1 | 10/2017 |

*Primary Examiner* — Javid A Amini
(74) *Attorney, Agent, or Firm* — Paratus Law Group, PLLC

(57) ABSTRACT

Even under a situation where an object to be presented has movement, the object can be presented as display information in a more favorable mode. An information processing apparatus includes an acquisition unit (111) that acquires information regarding movement of an object, and a control unit (111) that projects the object in a display region at a projection timing set according to a first period, and corrects display information according to a result of the projection in accordance with a plurality of display timings each set for each second period shorter than the first period, and the control unit controls correction of second display information to maintain continuity according to the movement of the object between first display information displayed according to a first projection result of the object in accordance with a first display timing, and the second display information displayed according to a second projection result of the object in accordance with a second display timing immediately after the first display timing.

18 Claims, 13 Drawing Sheets

(51) Int. Cl.
  *G06F 3/01*    (2006.01)
  *G06T 13/20*   (2011.01)
  *G06T 15/20*   (2011.01)

(52) U.S. Cl.
  CPC ........ *G06T 19/006* (2013.01); *G06T 2210/61* (2013.01); *G09G 2310/08* (2013.01); *G09G 2320/0261* (2013.01); *G09G 2340/0464* (2013.01); *G09G 2340/0492* (2013.01)

(58) Field of Classification Search
  USPC .......................................................... 345/633
  See application file for complete search history.

(56) References Cited

U.S. PATENT DOCUMENTS

2019/0102956 A1\* 4/2019 Ishihara ................ G06T 19/006
2019/0197960 A1\* 6/2019 Kim ....................... G09G 3/035

\* cited by examiner

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2019/039610 (filed on Oct. 8, 2019) under 35 U.S.C. § 371, which claims priority to Japanese Patent Application No. 2018-195198 (filed on Oct. 16, 2018), which are all hereby incorporated by reference in their entirety.

TECHNICAL FIELD

The present disclosure relates to an information processing apparatus, an information processing method, and a recording medium.

BACKGROUND ART

In recent years, the advancement of image recognition technology has enabled recognition of the position and orientation of a real object (that is, an object in a real space) included in an image captured by an imaging device. As one of applications of such object recognition, there is a technology called augmented reality (AR). By using the AR technology, virtual content (hereinafter, referred to as "virtual object") in various modes such as text, icons, and animations can be superimposed on an object in the real space (hereinafter referred to as "real object") and a superimposed image can be presented to a user. For example, Patent Document 1 discloses an example of a technology of presenting virtual content to a user using the AR technology.

An example of a method of presenting information to the user using the AR technology includes a method of using a so-called transmission-type display. Specifically, the transmission-type display is supported in front of the user's eyes, and display information is presented on the display, so that the user can visually recognize an image in which the display information is superimposed on an optical image of the real space.

CITATION LIST

Patent Document

Patent Document 1: International Publication No. 2017/183346

SUMMARY OF THE INVENTION

Problems to be Solved by the Invention

By the way, in a case where an object to be presented has three-dimensional information, the object is presented as two-dimensional display information as the object is projected on a screen surface according to the position or orientation of a viewpoint, for example, and a result of the projection is drawn. However, a situation where a delay occurs in processing regarding the projection and drawing, and the position or orientation of the viewpoint changes during the processing is assumed. Under such a situation, there may be a gap between actually presented display information and an originally assumed presentation mode of the display information. In particular, under a situation where the object to be presented autonomously moves, a user may perceive that the display information is blurred when the object is presented as the display information.

Therefore, the present disclosure proposes a technique of presenting an object to be presented as display information in a favorable mode even under a situation where the object has movement.

Solutions to Problems

According to the present disclosure, there is provided an information processing apparatus including an acquisition unit configured to acquire information regarding movement of an object, and a control unit configured to project the object in a display region at a projection timing set according to a first period, and correct display information according to a result of the projection in accordance with a plurality of display timings each set for each second period shorter than the first period, in which the control unit controls correction of second display information to maintain continuity according to the movement of the object between first display information displayed according to a first projection result of the object in accordance with a first display timing, and the second display information displayed according to a second projection result of the object in accordance with a second display timing immediately after the first display timing.

Furthermore, according to the present disclosure, there is provided an information processing method including, by a computer, acquiring information regarding movement of an object, and projecting the object in a display region at a projection timing set according to a first period, and correcting display information according to a result of the projection in accordance with a plurality of display timings each set for each second period shorter than the first period, in which correction of second display information is controlled to maintain continuity according to the movement of the object between first display information displayed according to a first projection result of the object in accordance with a first display timing, and the second display information displayed according to a second projection result of the object in accordance with a second display timing immediately after the first display timing.

Furthermore, according to the present disclosure, there is provided a storage medium recording a program for causing a computer to execute acquiring information regarding movement of an object, and projecting the object in a display region at a projection timing set according to a first period, and correcting display information according to a result of the projection in accordance with a plurality of display timings each set for each second period shorter than the first period, in which correction of second display information is controlled to maintain continuity according to the movement of the object between first display information displayed according to a first projection result of the object in accordance with a first display timing, and the second display information displayed according to a second projection result of the object in accordance with a second display timing immediately after the first display timing.

Effect of the Invention

As described above, according to the present disclosure, a technique of presenting an object to be presented as display information in a favorable mode even under a situation where the object has movement is provided.

Note that the above-described effect is not necessarily restrictive, and any one of effects described in the present specification or any another effect obtainable from the

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.

1. Outline
1.1. Schematic Configuration
1.2. Configuration of Input/Output Device
1.3. Principle of Self-position Estimation
1.4. Drawing Object
2. Examination of Delay Compensation
3. Technical Characteristics
3.1. Basic Idea
3.2. Functional Configuration
3.3. Processing
3.4. Modification
4. Hardware Configuration
4.1. Configuration Example as Independently Operable Device
4.2. Configuration Example When Implementing Information Processing Apparatus as Chip
5. Conclusion

1. Outline

<1.1. Schematic Configuration>

Figure 1:
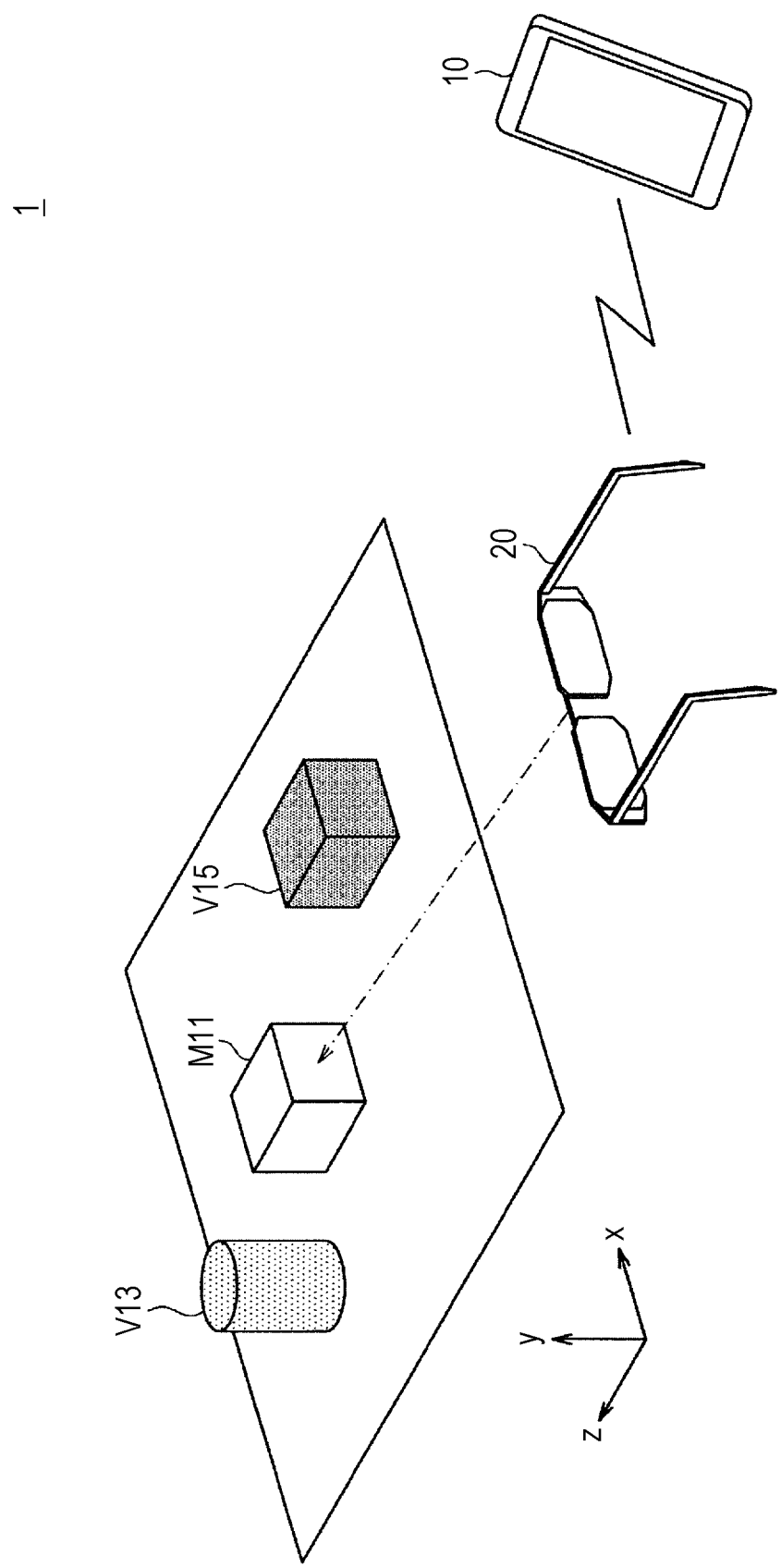
FIG. 1 is an explanatory view for describing an example of a schematic configuration of an information processing system according to an embodiment of the present disclosure.

First, an example of a schematic configuration of an information processing system according to an embodiment of the present disclosure will be described with reference to FIG. 1. FIG. 1 is an explanatory view for describing an example of a schematic configuration of an information processing system according to an embodiment of the present disclosure. In FIG. 1, reference code M11 schematically represents an object (that is, a real object) located in a real space. Furthermore, reference codes V13 and V15 schematically represent virtual content (that is, virtual objects) presented to be superimposed in the real space. In other words, an information processing system 1 according to the present embodiment superimposes the virtual objects on an object in the real space such as the real object M11 on the basis of a so-called augmented reality (AR) technology, for example, and presents the superimposed objects to a user. Note that, in FIG. 1, both the real object and the virtual objects are presented for easy understanding of characteristics of the information processing system according to the present embodiment.

As illustrated in FIG. 1, an information processing system 1 according to the present embodiment includes an information processing apparatus 10 and an input/output device 20. The information processing apparatus 10 and the input/output device 20 are able to transmit and receive information to and from each other via a predetermined network. Note that the type of network connecting the information processing apparatus 10 and the input/output device 20 is not particularly limited. As a specific example, the network may be configured by a so-called wireless network such as a network based on a Wi-Fi (registered trademark) standard. Furthermore, as another example, the network may be configured by the Internet, a dedicated line, a local area network (LAN), a wide area network (WAN), or the like. Furthermore, the network may include a plurality of networks, and some of the networks may be configured as a wired network.

The input/output device 20 is a configuration for obtaining various types of input information and presenting various types of output information to the user who holds the input/output device 20. Furthermore, the presentation of the output information by the input/output device 20 is controlled by the information processing apparatus 10 on the basis of the input information acquired by the input/output device 20. For example, the input/output device 20 acquires, as the input information, information for recognizing the real object M11, and outputs the acquired information to the information processing apparatus 10. The information processing apparatus 10 recognizes the position of the real object M11 in the real space on the basis of the information acquired from the input/output device 20, and causes the input/output device 20 to present the virtual objects V13 and V15 on the basis of the recognition result. With such control, the input/output device 20 can present, to the user, the virtual objects V13 and V15 such that the virtual objects V13 and V15 are superimposed on the real object M11 on the basis of the so-called AR technology. Note that, in FIG. 1, the input/output device 20 and the information processing apparatus 10 are illustrated as devices different from each other. However, the input/output device 20 and the information processing apparatus 10 may be integrally configured. Furthermore, details of the configurations and processing of the input/output device 20 and the information processing apparatus 10 will be separately described below.

An example of the schematic configuration of the information processing system according to the embodiment of the present disclosure has been described with reference to FIG. 1.

<1.2. Configuration of Input/Output Device>

Figure 2:
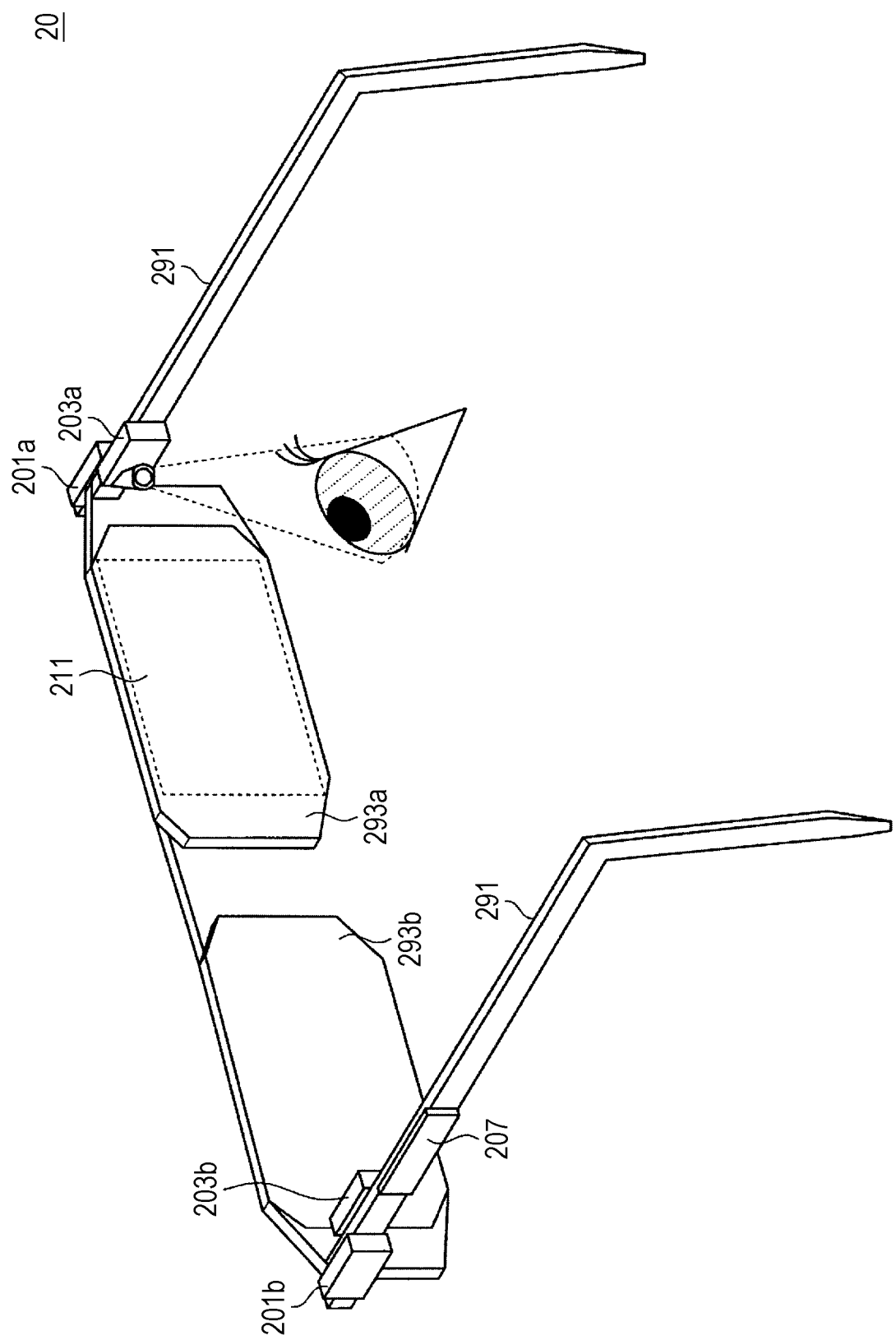
FIG. 2 is an explanatory view for describing an example of a schematic configuration of an input/output device according to the present embodiment.

Next, an example of a schematic configuration of the input/output device 20 according to the present embodiment illustrated in FIG. 1 will be described with reference to FIG. 2. FIG. 2 is an explanatory view for describing an example of a schematic configuration of the input/output device according to the present embodiment.

The input/output device 20 according to the present embodiment is configured as a so-called head-mounted device mounted on at least part of the head of the user and used by the user. For example, in the example illustrated in FIG. 2, the input/output device 20 is configured as a so-called eyewear-type (glasses-type) device. At least one of the lens 293a or 293b is configured as a transmission-type display (output unit 211). Furthermore, the input/output device 20 includes first imaging units 201a and 201b, second imaging units 203a and 203b, an operation unit 207, and a holding unit 291 corresponding to a frame of the glasses. The holding unit 291 holds the output unit 211, the first imaging units 201a and 201b, the second imaging units 203a and 203b, and the operation unit 207 to have a predetermined positional relationship with respect to the head of the user when the input/output device 20 is mounted on the head of the user. Furthermore, although not illustrated in FIG. 2, the input/output device 20 may be provided with a sound collection unit for collecting a voice of the user.

Here, a more specific configuration of the input/output device 20 will be described. For example, in the example illustrated in FIG. 2, the lens 293a corresponds to a lens on a right eye side, and the lens 293b corresponds to a lens on a left eye side. In other words, the holding unit 291 holds the output unit 211 such that the output unit 211 (in other words, the lenses 293a and 293b) is located in front of the eyes of the user in the case where the input/output device 20 is worn by the user.

The first imaging units 201a and 201b are configured as so-called stereo cameras and are held by the holding unit 291 to face a direction in which the head of the user is directed (in other words, the front of the user) when the input/output device 20 is mounted on the head of the user. At this time, the first imaging unit 201a is held near the user's right eye, and the first imaging unit 201b is held near the user's left eye. The first imaging units 201a and 201b capture a subject (in other words, the real object located in the real space) located in front of the input/output device 20 from different positions from each other on the basis of such a configuration. Thereby, the input/output device 20 acquires images of the subject located in front of the user and can calculate a distance to the subject from the input/output device 20 on the basis of a parallax between the images respectively captured by the first imaging units 201a and 201b. Note that, in the present disclosure, description of "image" can include "still image" and "moving image" unless otherwise specified.

Note that the configuration and method are not particularly limited as long as the distance between the input/output device 20 and the subject can be measured. As a specific example, the distance between the input/output device 20 and the subject may be measured on the basis of a method such as multi-camera stereo, moving parallax, time of flight (TOF), or structured light. Here, the TOF is a method of obtaining an image (so-called distance image) including a distance (depth) to a subject on the basis of a measurement result by projecting light such as infrared light on the subject and measuring a time required for the projected light to be reflected by the subject and return, for each pixel. Furthermore, the structured light is a method of obtaining a distance image including a distance (depth) to a subject on the basis of a change in a pattern obtained from an imaging result by irradiating the subject with the pattern of light such as infrared light and capturing the pattern. Furthermore, the moving parallax is a method of measuring a distance to a subject on the basis of a parallax even in a so-called monocular camera. Specifically, the subject is captured from different viewpoints from each other by moving the camera, and the distance to the subject is measured on the basis of the parallax between the captured images. Note that, at this time, the distance to be subject can be measured with more accuracy by recognizing a moving distance and a moving direction of the camera using various sensors. Note that the configuration of the imaging unit (for example, the monocular camera, the stereo camera, or the like) may be changed according to the distance measuring method.

Furthermore, the second imaging units 203a and 203b are held by the holding unit 291 such that eyeballs of the user are located within respective imaging ranges when the input/output device 20 is mounted on the head of the user. As a specific example, the second imaging unit 203a is held such that the user's right eye is located within the imaging range. The direction in which the line-of-sight of the right eye is directed can be recognized on the basis of an image of the eyeball of the right eye captured by the second imaging unit 203a and a positional relationship between the second imaging unit 203a and the right eye on the basis of such a configuration. Similarly, the second imaging unit 203b is held such that the user's left eye is located within the imaging range. In other words, the direction in which the line-of-sight of the left eye is directed can be recognized on the basis of an image of the eyeball of the left eye captured by the second imaging unit 203b and a positional relationship between the second imaging unit 203b and the left eye. Note that the example in FIG. 2 illustrates the configuration in which the input/output device 20 includes both the second imaging units 203a and 203b. However, only one of the second imaging units 203a and 203b may be provided.

The operation unit 207 is a configuration for receiving an operation on the input/output device 20 from the user. The operation unit 207 may be configured by, for example, an input device such as a touch panel or a button. The operation unit 207 is held at a predetermined position of the input/output device 20 by the holding unit 291. For example, in the example illustrated in FIG. 2, the operation unit 207 is held at a position corresponding to a temple of the glasses.

Furthermore, the input/output device 20 according to the present embodiment may be provided with, for example, an acceleration sensor and an angular velocity sensor (gyro sensor) and may be able to detect movement of the head of the user wearing the input/output device 20 (in other words, movement of the input/output device 20 itself). As a specific example, the input/output device 20 may recognize a change in at least either the position or orientation of the head of the user by detecting components in a yaw direction, a pitch direction, and a roll direction as the movement of the head of the user.

The input/output device 20 according to the present embodiment can recognize changes in its own position and orientation in the real space according to the movement of the head of the user on the basis of the above configuration. Furthermore, at this time, the input/output device 20 can present the virtual content (in other words, the virtual object) to the output unit 211 to superimpose the virtual content on the real object located in the real space on the basis of the so-called AR technology. Note that an example of a method for the input/output device 20 to estimate its own position and orientation in the real space (that is, self-position estimation) will be described below in detail.

Note that examples of a head-mounted display (HMD) device applicable as the input/output device 20 include a see-through HMD, a video see-through HMD, and a retinal projection HMD.

The see-through HMD uses, for example, a half mirror or a transparent light guide plate to hold a virtual image optical system including a transparent light guide or the like in front of the eyes of the user, and displays an image inside the virtual image optical system. Therefore, the user wearing the see-through HMD can take the external scenery into view while viewing the image displayed inside the virtual image optical system. With such a configuration, the see-through HMD can superimpose an image of the virtual object on an optical image of the real object located in the real space according to the recognition result of at least one of the position or orientation of the see-through HMD on the basis of the AR technology, for example. Note that a specific example of the see-through HMD includes a so-called glasses-type wearable device in which a portion corresponding to a lens of glasses is configured as a virtual image optical system. For example, the input/output device 20 illustrated in FIG. 2 corresponds to an example of the see-through HMD.

In a case where the video see-through HMD is mounted on the head or face of the user, the video see-through HMD is mounted to cover the eyes of the user, and a display unit such as a display is held in front of the eyes of the user. Furthermore, the video see-through HMD includes an imaging unit for capturing surrounding scenery, and causes the display unit to display an image of the scenery in front of the user captured by the imaging unit. With such a configuration, the user wearing the video see-through HMD has a difficulty in directly taking the external scenery into view but the user can confirm the external scenery with the image displayed on the display unit. Furthermore, at this time, the video see-through HMD may superimpose the virtual object on an image of the external scenery according to the recognition result of at least one of the position or orientation of the video see-through HMD on the basis of the AR technology, for example.

The retinal projection HMD has a projection unit held in front of the eyes of the user, and an image is projected from the projection unit toward the eyes of the user such that the image is superimposed on the external scenery. More specifically, in the retinal projection HMD, an image is directly projected from the projection unit onto the retinas of the eyes of the user, and the image is imaged on the retinas. With such a configuration, the user can view a clearer image even in a case where the user has myopia or hyperopia. Furthermore, the user wearing the retinal projection HMD can take the external scenery into view even while viewing the image projected from the projection unit. With such a configuration, the retinal projection HMD can superimpose an image of the virtual object on an optical image of the real object located in the real space according to the recognition result of at least one of the position or orientation of the retinal projection HMD on the basis of the AR technology, for example.

Furthermore, an HMD called immersive HMD can also be mentioned in addition to the above-described examples. The immersive HMD is mounted to cover the eyes of the user, and a display unit such as a display is held in front of the eyes of the user, similarly to the video see-through HMD. Therefore, the user wearing the immersive HMD has a difficulty in directly taking an external scenery (in other words, scenery of a real world) into view, and only an image displayed on the display unit comes into view. With such a configuration, the immersive HMD can provide an immersive feeling to the user who is viewing the image. Therefore, the immersive HMD can be applied in a case of presenting information mainly based on a virtual reality (VR) technology, for example.

An example of the schematic configuration of the input/output device according to the embodiment of the present disclosure has been described with reference to FIG. 2.

<1.3. Principle of Self-Position Estimation>

Next, an example of a principle of a technique for the input/output device 20 to estimate its own position and orientation in the real space (that is, self-position estimation) when superimposing the virtual object on the real object will be described.

As a specific example of the self-position estimation, the input/output device 20 captures an image of a marker or the like having a known size presented on the real object in the real space, using an imaging unit such as a camera provided in the input/output device 20. Then, the input/output device 20 estimates at least one of its own relative position or orientation with respect to the marker (and thus the real object on which the marker is presented) by analyzing the captured image. Note that the following description will be given focusing on the case where the input/output device 20 estimates its own position and orientation. However, the input/output device 20 may estimate only one of its own position or orientation.

Specifically, a relative direction of the imaging unit with respect to the marker (and thus the input/output device 20 provided with the imaging unit) can be estimated according to the direction of the marker (for example, the direction of a pattern and the like of the marker) captured in the image. Furthermore, in the case where the size of the marker is known, the distance between the marker and the imaging unit (that is, the input/output device 20 provided with the imaging unit) can be estimated according to the size of the marker in the image. More specifically, when the marker is captured from a farther distance, the marker is captured smaller. Furthermore, a range in the real space captured in the image at this time can be estimated on the basis of an angle of view of the imaging unit. By using the above characteristics, the distance between the marker and the imaging unit can be calculated backward according to the size of the marker captured in the image (in other words, a ratio occupied by the marker in the angle of view). With the above configuration, the input/output device 20 can estimate its own relative position and orientation with respect to the marker.

Furthermore, a technology so-called simultaneous localization and mapping (SLAM) may be used for the self-position estimation of the input/output device 20. SLAM is a technology for performing self-position estimation and creation of an environmental map in parallel by using an imaging unit such as a camera, various sensors, an encoder, and the like. As a more specific example, in SLAM (in particular, Visual SLAM), a three-dimensional shape of a captured scene (or subject) is sequentially restored on the basis of a moving image captured by the imaging unit. Then, by associating a restoration result of the captured scene with a detection result of the position and orientation of the imaging unit, creation of a map of a surrounding environment and estimation of the position and orientation of the imaging unit (and thus the input/output device 20) in the environment are performed. Note that the position and orientation of the imaging unit can be estimated as information indicating relative change on the basis of detection results of various sensors by providing the various sensors such as an acceleration sensor and an angular velocity sensor to the input/output device 20, for example. Of course, the estimation method is not necessarily limited to the method based on the detection results of the various sensors such as an acceleration sensor and an angular velocity sensor as long as the position and orientation of the imaging unit can be estimated.

Under the above configuration, the estimation result of the relative position and orientation of the input/output device 20 with respect to the known marker, which is based on the imaging result of the marker by the imaging unit, may be used for initialization processing or position correction in SLAM described above, for example. With the configuration, the input/output device 20 can estimate its own position and orientation with respect to the marker (and thus the real object on which the marker is presented) by the self-position estimation based on SLAM reflecting results of the initialization and position correction executed before even in a situation where the marker is not included in the angle of view of the imaging unit.

Furthermore, the above description has been made focusing on the example of the case of performing the self-position estimation mainly on the basis of the imaging result of the marker. However, a detection result of another target other than the marker may be used for the self-position estimation as long as the detection result can be used as a reference for the self-position estimation. As a specific example, a detection result of a characteristic portion of an object (real object) in the real space, such as a shape or pattern of the object, instead of the marker, may be used for the initialization processing or position correction in SLAM.

An example of the principle of the technique for the input/output device 20 to estimate its own position and orientation in the real space (that is, self-position estimation) when superimposing the virtual object on the real object has been described. Note that the following description will be given on the assumption that the position and orientation of the input/output device 20 with respect to an object (real object) in the real space can be estimated on the basis of the above-described principle, for example.

<1.4. Drawing Object>

Next, an outline of an example of processing of presenting an object (for example, a virtual object) having three-dimensional shape information as two-dimensional display information will be described.

Figure 3:
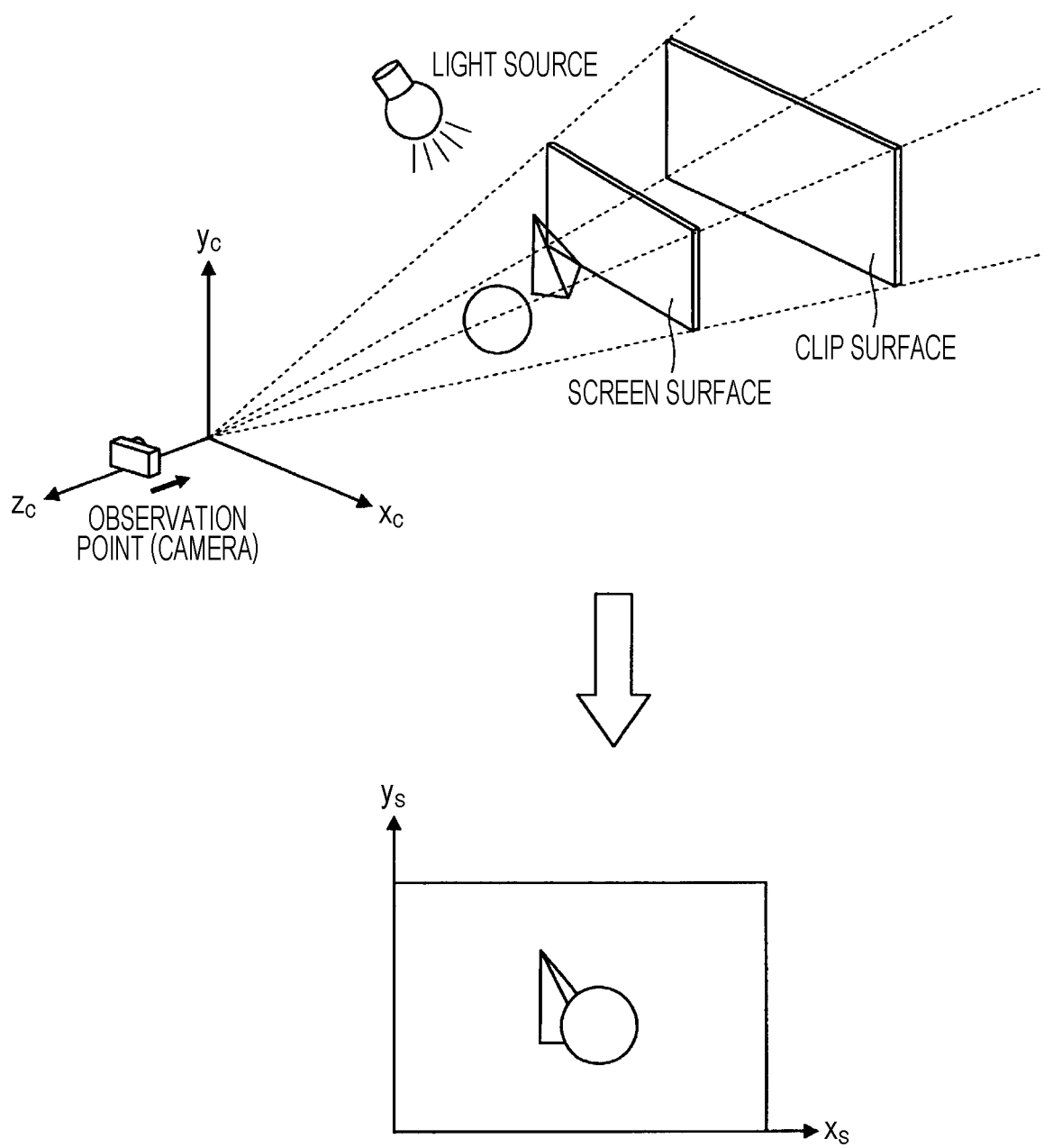
FIG. 3 is an explanatory diagram for describing an outline of an example of processing for presenting an object having three-dimensional shape information as two-dimensional display information.

For example, FIG. 3 is an explanatory diagram for describing an outline of an example of processing of presenting an object having three-dimensional shape information as two-dimensional display information. Note that the processing illustrated in FIG. 3 can be implemented by processing called "vertex shader", for example.

As illustrated in FIG. 3, in the case of presenting an object having three-dimensional shape information as two-dimensional display information, a target object is projected on a screen surface defined according to the field of view (angle of view) from an observation point (that is, viewpoint) with respect to the observation point in a three-dimensional space. That is, the screen surface can correspond to a projection surface. At this time, a color of the object when the object is drawn as the two-dimensional display information may be calculated according to a positional relationship between a light source defined in the three-dimensional space and the object. The two-dimensional shape of the object, the color of the object, the two-dimensional position at which the object is presented (that is, the position on the screen surface), and the like are calculated according to the relative positional relationship among the observation point, the object, and the screen surface according to the position and orientation of the observation point.

Note that the example in FIG. 3 illustrates an example of a projection method in a case where a clip surface is located on a back side of the target object, that is, in a case where the object is projected on the screen surface located on the back side. In contrast, as another example of the projection method, there is a method in which the clip surface is located on a front side of the target object, and the object is projected on the screen surface located on the front side. In the following description, the case where the clip surface is located on the back side of the target object will be described as an example, as illustrated in FIG. 3. However, the object projection method is not necessarily limited, and the case where the clip surface is located on the front side of the object similarly works unless technical discrepancies occur.

The projection result of the object obtained as described above is drawn as display information for a desired drawing region, for example. Note that the processing regarding drawing of the display information can be implemented by, for example, processing called "pixel shader".

That is, as a specific example, the above-described desired drawing region is associated with at least a part of the screen surface illustrated in FIG. 3, and the projection result of the object onto the region is drawn as display information, for example. Furthermore, the drawing region is associated with a display region of an output unit such as a display, and a drawing result of the display information to the drawing region can be presented in the display region. The drawing region may be defined as at least a partial region of a predetermined buffer (for example, a frame buffer) that temporarily or permanently holds data such as the drawing result.

Furthermore, as another example, the display region itself of the output unit may be used as the drawing region. In this case, the display information is directly drawn in the display region corresponding to the drawing region, so that the display information is presented in the display region. Furthermore, in this case, the display region itself can correspond to the screen surface (projection surface).

As described above, an object having three-dimensional shape information can be presented in the display region of a predetermined output unit as the two-dimensional display information according to a relative relationship of the positions or orientations between the object and an observation point (viewpoint).

The outline of an example of processing for presenting an object (for example, a virtual object) having three-dimensional shape information as two-dimensional display information has been described.

2. Examination of Delay Compensation

As described above, in a case where an object having a three-dimensional shape is presented as two-dimensional display information, the object is projected onto the screen surface according to the position or orientation relationship between the viewpoint and the object, and a result of the projection is drawn.

However, a load on the processing regarding the projection and drawing may become high, and a situation where a delay occurs in the processing, and the position or orientation of the viewpoint changes after completion of the processing may be assumed. In particular, under a situation where the display information is presented by being superimposed on an optical image of an object (real object) in the real space on the basis of the AR technology, there may be a gap between a position on which the display information is originally assumed to be superimposed and a position on which the display information is actually superimposed, for example. Therefore, under such a situation, the gap is easily perceived by the user.

(Application of Reprojection)

In such a case, for example, there may be a gap (for example, a gap in position, orientation, size, or the like) between the display information that can be visually recognized according to the position or orientation of the viewpoint at that time (that is, the display information visually recognized in an ideal state) and the actually presented display information. In such a case, the influence of the gap in the display information, which has been caused due to the delay, may be reduced by correcting a presentation position, orientation (shape), size, and the like of the display information according to the position or orientation of the viewpoint at that time in presenting the display information according to a drawing result, for example. Note that, hereinafter, processing regarding such correction (for example, deformation) will also be referred to as reprojection.

Figure 4:
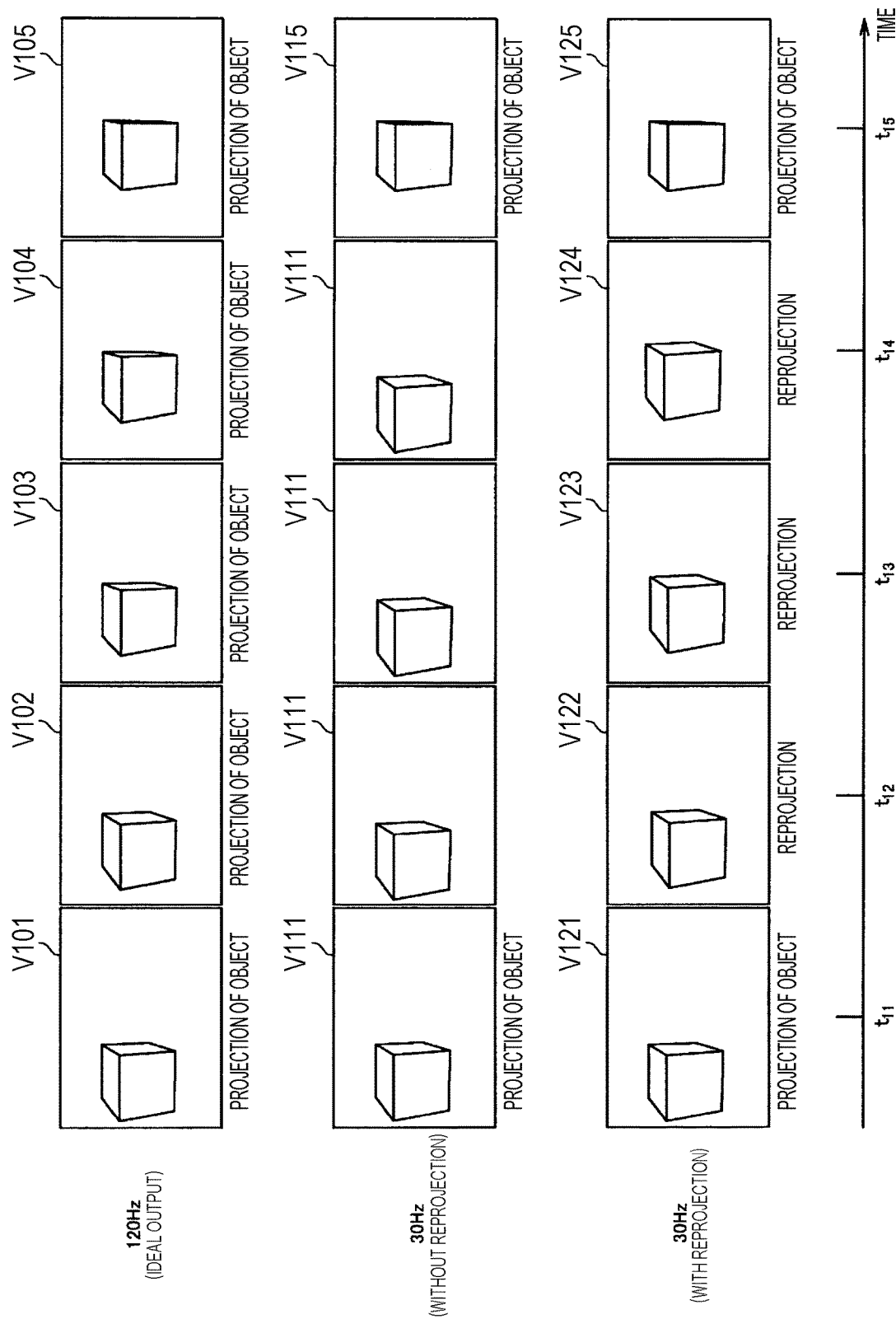
FIG. 4 is an explanatory diagram for describing an outline of reprojection.

For example, FIG. 4 is an explanatory diagram for describing an outline of the reprojection, illustrating an example of a case of correcting a presentation position of the display information according to a projection result of an object. In the example illustrated in FIG. 4, an example of display information presentation modes in a case where the processing regarding the projection or the drawing is executed at a rate of 30 Hz under a situation where information is presented to the output unit at a refresh rate of 120 Hz. Specifically, in the example illustrated in FIG. 4, as examples of the display information presentation mode, "ideal output", "output without reprojection", and "output with reprojection" are chronologically presented in a comparable manner.

Note that, in the example illustrated in FIG. 4, the "ideal output" illustrates a video in which the display information according to the result of the projection or drawing is presented, in a case where the processing regarding the projection or drawing can be executed at the refresh rate of 120 Hz. Meanwhile, the "output without reprojection" illustrates a video in which the display information according to the result of the projection or drawing is presented, in a case where the processing regarding the projection or drawing is executed at the rate of 30 Hz, and the reprojection is not applied. Furthermore, the "output with reprojection" illustrates a video in which the display information according to the result of the projection or drawing is presented, in a case where the processing regarding the projection or drawing is executed at the rate of 30 Hz, and the reprojection is applied.

Furthermore, in FIG. 4, the horizontal axis represents time, and reference codes t11 to t15 represent timings chronologically arranged in this order. More specifically, in the example illustrated in FIG. 4, each of the timings t11 to t15 schematically represents each timing at which information is presented to the output unit at the refresh rate of 120 Hz.

Furthermore, reference codes V101 to V105 schematically represent images respectively presented at the timings t11 to t15 in a case where the ideal output is performed. That is, in the case of the ideal output, at each of the timings t11 to t15, a projection result of an object according to a relative position or orientation relationship between the viewpoint and the object at that time is presented as the display information.

In contrast, reference codes V111 and V115 schematically represent images respectively presented at the timings t11 to t15 in a case where the output without reprojection is performed. As can be seen by comparing the ideal output and the output without reprojection, in the case of the output without reprojection, only the image V111 is continuously presented in a period of the timings t11 to t14 where the images V101 to V104 are sequentially presented as the ideal outputs. From the fact, in the case of the output without reprojection, even if the relative position or orientation relationship between the viewpoint and the object changes during the period from the timings t11 to t14, it is difficult to present the display information in a mode considering the change.

Furthermore, reference codes V121 and V125 schematically represent images respectively presented at the timings t11 to t15 in a case where the output with reprojection is performed. Specifically, in the example illustrated in FIG. 4, at each of the timings t12 to t14, correction of the presentation position according to the position or orientation of the viewpoint detected at the timing t11 is applied to the display information according to the projection result of the object at the timing t11, as the reprojection. That is, in the example illustrated in FIG. 4, as can be seen by comparing the images V101 to V104 and the images V121 to V124, correction has been performed such that the presentation position of the display information according to the projection result of the object moves toward the case where the ideal output is performed with the execution of the reprojection. As a result, a video expressing the movement of the object with higher resolution than the case of the output without reprojection (that is, a video in which the movement of the object is more smoothly reproduced) can be presented to the user.

(Technical Problems that Become Apparent by Applying Reprojection)

Meanwhile, in a case of reproducing a situation where an object autonomously moves in the real space by animation or the like, the user may perceive that a presented video is blurred depending on a load on the processing regarding projection and drawing of the object, for example.

Figure 5:
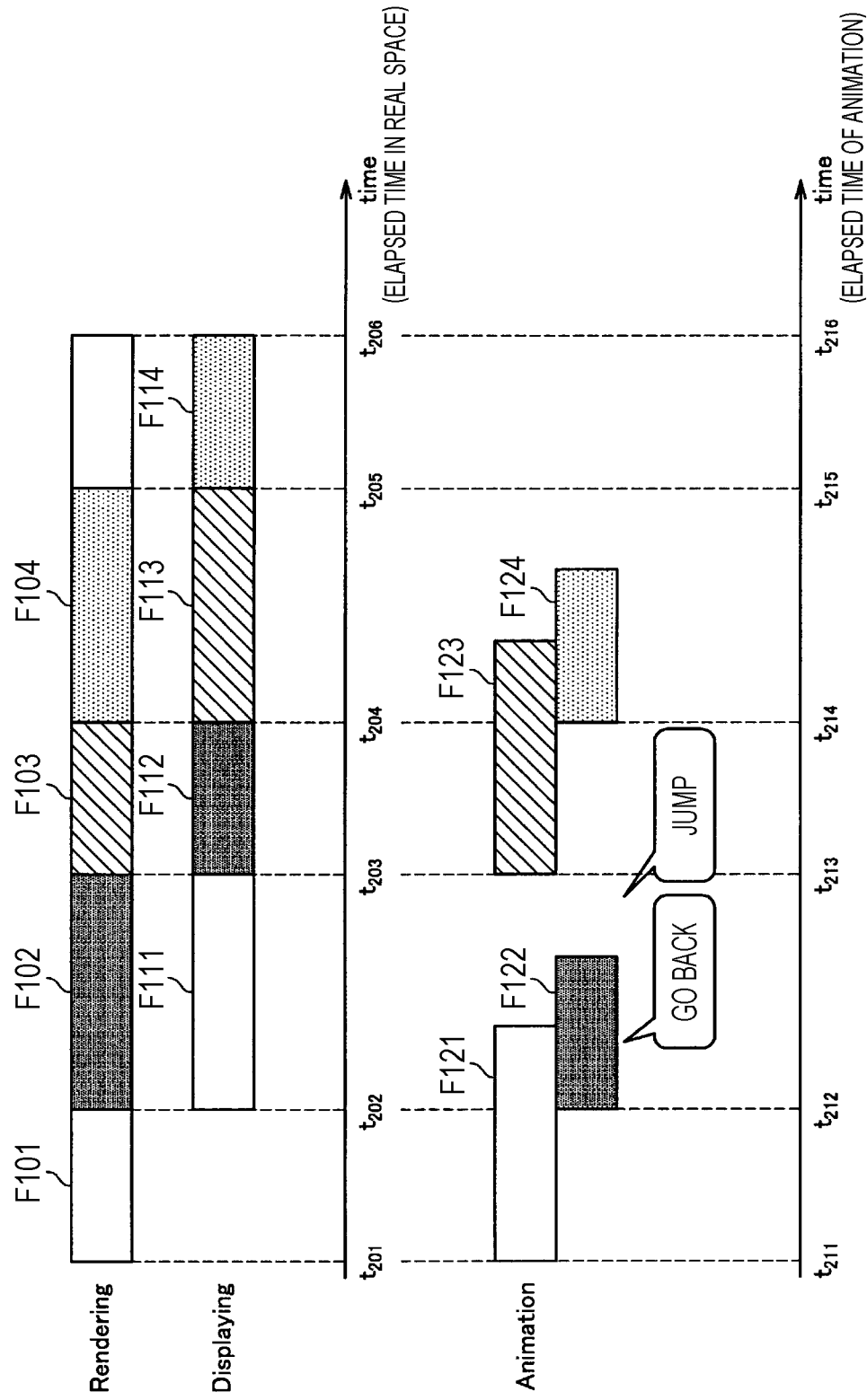
FIG. 5 is an explanatory diagram for describing an outline of a mechanism in which a presented image is blurred according to a load on processing regarding projection and drawing of an object.

For example, FIG. 5 is an explanatory diagram for describing an outline of a mechanism in which a presented video is blurred according to a load on the processing regarding projection and drawing of an object. In FIG. 5, reference codes t201 to t206 represent timings on a time axis in the real space. More specifically, each of the timings t201 to t205 schematically illustrates a timing at which processing (Rendering) regarding projection and drawing of an object, or processing (Displaying) regarding presentation of the display information according to result of the projection and drawing is executed. In contrast, reference codes t211 to t216 represent timings on a time axis on an animation (in other words, a time axis in a virtual space) in a case of presenting the display information as the animation. Note that, in the example illustrated in FIG. 5, the timings t211 to t216 are set in association with the timings t201 to t206.

Furthermore, each of reference codes F101 to F104 schematically represents a situation in which the processing (Rendering) regarding projection and drawing of the object is sequentially executed in chronological order. Furthermore, each of reference codes F111 to F114 schematically represents a situation in which the processing (Displaying) regarding presentation of the display information according to the result of the projection and drawing is sequentially executed in chronological order. That is, a length in a horizontal direction of each of the processing F101 to F104 and F111 to F114 schematically illustrates a period from start to end of the processing. That is, in the example illustrated in FIG. 5, the processing F102 and the processing F104 have a longer time from the start to the end of the processing than the processing F101 and the processing F103 due to the influence of, for example, the processing load. That is, each of the timings t202 to t203 is set so that the period of the timings t202 to t203 and the period of the timings t204 to t205 become longer than the period of the timings t201 to t202 and the period of the timings t203 to t204.

For example, presentation of the display information according to the result of the processing regarding projection and drawing of the object is executed after the processing is terminated under the above-described assumption. For example, in the example illustrated in FIG. 5, the processing F101 regarding projection and drawing of the object is executed from the timing t201 as a starting point according to the position or orientation of the viewpoint at the timing t201. Next, the processing F111 regarding presentation of the display information according to the result of the processing F101 is executed from the timing t202 on or after the end of the processing F101 as the starting point. Furthermore, when the processing F101 ends, the processing F102 regarding projection and drawing of the object is executed from the timing t202 as the starting point according to the position or orientation of the viewpoint at the timing t202 on or after the end of the processing F101. As described above, the processing F101 to F104 regarding projection and drawing of the object and the processing F111 to F114 regarding presentation of the display information according to the results of the processing F101 to F104 are sequentially executed along the time axis in the real space.

Furthermore, each of reference codes F121 to F124 schematically represents a situation in which an animation that reproduces movement of the object is presented along the time axis on the animation according to the execution results of the processing F111 to F114. At this time, in each of the animations F121 to F124, the movement of the object is determined according to the position or orientation of the viewpoint at the timings t201 to t204. Therefore, the starting point of the movement of the object presented as each of the animations F121 to F124 is each of timings t211 to t214 on the time axis on the animation corresponding to the timings t201 to t204. In contrast, the period during which each of the animations F121 to F124 is presented depends on the period of the corresponding processing among the processing F111 to F114 regarding presentation of the display information.

More specifically, as illustrated in FIG. 5, the animation F121 is presented with the execution of the processing F111. At this time, the movement of the object presented as the animation F121 is determined according to the position and orientation of the viewpoint at the timing t201. In other words, the movement of the object can be determined according to the position or orientation relationship between the viewpoint and the object at the timing t201. Therefore, the starting point of the movement of the object presented as the animation F121 is the timing t211 on the time axis on the animation corresponding to the timing t201. Furthermore, the period during which the animation F121 is presented depends on the period during which the processing F111 is executed, that is, the length of the period between the timings t202 and t203.

Next, the animation F122 is presented with the execution of the processing F112. At this time, the movement of the object presented as the animation F122 is determined according to the position and orientation of the viewpoint at timing t202. Therefore, the starting point of the movement of the object presented as the animation F122 is the timing t212 on the time axis on the animation corresponding to the timing t202. Furthermore, the period during which the animation F122 is presented depends on the period during which the processing F112 is executed, that is, the length of the period between the timings t203 and t204.

Next, the animation F123 is presented with the execution of the processing F113. At this time, the movement of the object presented as the animation F123 is determined according to the position and orientation of the viewpoint at timing t203. Therefore, the starting point of the movement of the object presented as the animation F123 is the timing t213 on the time axis on the animation corresponding to the timing t203. Furthermore, the period during which the animation F123 is presented depends on the period during which the processing F113 is executed, that is, the length of the period between the timings t204 and t205.

Furthermore, the animation F124 is presented with the execution of the processing F114. At this time, the movement of the object presented as the animation F123 is determined according to the position and orientation of the viewpoint at timing t204. Therefore, the starting point of the movement of the object presented as the animation F124 is the timing t214 on the time axis on the animation corresponding to the timing t204. Furthermore, the period during which the animation F124 is presented depends on the length of the period during which the processing F113 is executed, that is, the length of the period between the timings t205 and t206.

Here, first, attention is paid to the relationship between the presentation of the animation F121 and the presentation of the animation F122. In the example illustrated in FIG. 5, the timings as the starting points of the movement of the object presented by the animations F121 and F122 are the timings t211 and t212 as described above. Meanwhile, the period from the start to the end of the antecedently displayed animation F121 is longer than the period between the timings t211 and t212. Therefore, as illustrated in FIG. 5, the timing at which the animation F121 ends is later than the timing t212 on the time axis on the animation. Therefore, for example, in a case where correction of the display information (reprojection or reprojection processing) is applied in consideration of the length of the period between the timings t211 and t212 in which the processing F111 is executed, chronological connection on the time axis on the animation may become discontinuous between the presentation of the animation F121 and the presentation of the animation F122.

As a specific example, when the animations F121 and F122 are displayed in sequence, the display information is sometimes displayed such that the object behaves as if the time went back between the animations F121 and F122. This similarly applies to the relationship between the presentation of the animation F123 and the presentation of the animation F124.

Next, attention is paid to the relationship between the presentation of the animation F122 and the presentation of the animation F123. In the example illustrated in FIG. 5, the timings as the starting points of movement of the object presented by the animations F122 and F123 are the timings t212 and t213 as described above. Meanwhile, the period from the start to the end of the antecedently displayed animation F122 is shorter than the period between the timings t212 and t213. Therefore, the timing at which the animation F123 is started is further later than the timing at which the animation F122 ends. Therefore, for example, in a case where correction of the display information (reprojection) is applied in consideration of the length of the period between the timings t212 and t213 in which the processing F112 is executed, chronological connection on the time axis on the animation may become discontinuous between the presentation of the animation F122 and the presentation of the animation F123. As a specific example, when the animations F121 and F122 are displayed in sequence, the display information is sometimes displayed such that the object behaves as if the time jumped between the animations F121 and F122.

That is, as described above, when the display information is presented as if the time went back or jumped, there is a portion where the movement of the object presented as the display information is discontinuous. Under such a situation, for example, the user may perceive that the movement of the object presented as the display information is blurred.

In view of the above situation, the present disclosure proposes a technique of presenting an object to be presented as display information in a favorable mode even under a situation where the object has movement. Specifically, proposed is a technique of suppressing a situation in which the display information is presented as if a portion where the movement of the object is discontinuous has occurred from becoming apparent, and presenting a video in which the movement of the object is shown in a more natural manner, in presenting the object having movement as the display information.

3. Technical Characteristics

Hereinafter, technical characteristics of the information processing system 1 according to the embodiment of the present disclosure will be described.

<3.1. Basic Idea>

First, a basic idea of the technique in which the information processing system 1 according to an embodiment of the present suppresses a situation in which the display information is presented as if a portion where the movement of the object is discontinuous has occurred from becoming apparent, will be described below. Note that, in the present description, to make characteristics of the information processing system according to the present embodiment easier to understand, first, an example of a case in which a portion where movement of an object is discontinuous occurs will be described as a comparative example, and then the basic idea of the technical characteristics of the information processing system will be described.

(Comparative Example)

Figure 6:
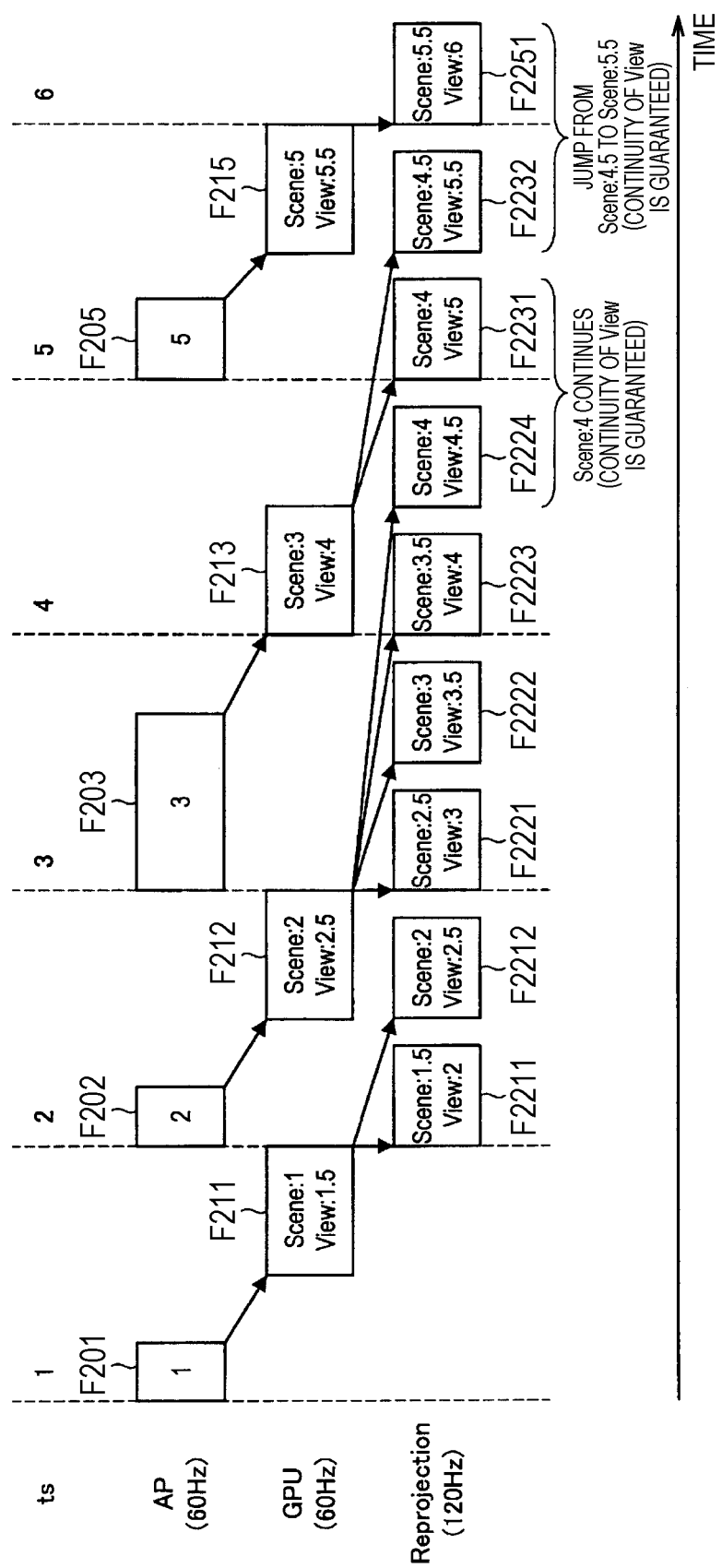
FIG. 6 is an explanatory diagram for describing an example of an operation regarding presentation of information by an information processing system according to a comparative example.

For example, FIG. 6 is an explanatory diagram for describing an example of an operation regarding presentation of information by an information processing system according to the comparative example, illustrating an example of a case in which a portion where movement of an object is discontinuous occurs. Note that, in FIG. 6, the horizontal axis represents "time".

In FIG. 6, "ts" represents each of timings on a reference time axis of processing, with an identifier as a timestamp, in executing various types of processing for presenting a target object as display information. More specifically, in the example illustrated in FIG. 6, the timestamp ts represents each timing of each predetermined period (for example, each frame) on the reference time axis, using a numerical value as the identifier. Furthermore, the timestamp ts represents a timing of each predetermined unit period (hereinafter also referred to as "frame") on the reference time axis. As a more specific example, in the example illustrated in FIG. 6, the timestamp ts=1 represents a start timing of the first frame on the reference time axis. Note that, in the following description, simple description of the "reference time axis" indicates a reference time axis of the various types of processing for presenting the target object as display information unless otherwise specified. Furthermore, in the following description, description of the "frame" indicates the predetermined unit period on the reference time axis unless otherwise specified. Furthermore, the predetermined unit period (for example, the above frame) on the reference time axis corresponds to an example of "first period".

"AP" schematically represents processing that can be executed by an upper layer such as an application among the various types of processing for presenting the target object as the display information, for example. The application in the present disclosure includes at least an application using augmented reality technology (AR technology), that is, an augmented reality application (AR application). The processing corresponds to, for example, processing regarding determination and update of the positional relationship and movement of the target object (so-called processing regarding determination and update of a scene graph), for example. That is, the frame corresponds to a period regarding determination and update of a scene graph of the AR application. For example, reference codes F201, F202, F203, and F205 schematically represent the processing that can be executed by an upper layer for each frame. Specifically, the processing F201 represents the processing that can be executed by an upper layer in the frame corresponding to the timestamp ts=1 (for example, the processing regarding determination and update of a scene graph). Similarly, each of the processing F202, F203, and F205 represents processing that can be performed by an upper layer in the frames respectively corresponding to the timestamps ts=2, ts=3, and ts=5. Note that, in the following description, the processing illustrated as "AP" mainly represents the processing regarding determination and update of a scene graph for convenience.

"GPU" schematically represents processing that can be executed by an image processing engine such as a GPU among the various types of processing for presenting the target object as the display information, for example. The processing may correspond to, for example, processing regarding projection of the object according to a positional relationship between a viewpoint and the object, and processing regarding drawing of display information according to a result of the projection. For example, each of reference codes F211, F212, F213, and F215 schematically represents the processing that can be executed by the GPU in response to an execution result of the processing by an upper layer. Specifically, the processing F211 represents the processing that can be executed by the GPU in response to the execution result of the processing F201. Similarly, each of the processing F212, F213, and F215 represents processing that can be executed by the GPU in response to the execution result of the processing F202, F203, and F205. Note that, in the following description, the processing illustrated as "GPU" mainly indicates the processing regarding projection of an object according to the result of the determination or update of a scene graph (that is, the processing regarding projection according to the positional relationship between the viewpoint and the object), and the processing regarding drawing of the display information according to the result of the projection. Furthermore, a timing at which the processing regarding projection of an object is executed, among the timings at which the processing illustrated as "GPU" (for example, the processing F212, F213, and F215 in FIG. 6) is executed, especially corresponds to an example of "projection timing".

"Reprojection" schematically represents processing corresponding to reprojection, in other words, processing regarding correction of the display information according to a drawing result. For example, each of reference codes F2211 and F2212 represents processing corresponding to reprojection executed according to the position or orientation of the viewpoint in accordance with a presentation timing of the display information in response to the execution result of the processing F211. Similarly, each of reference codes F2221 to F2224 represents processing corresponding to reprojection executed in response to the execution result of the processing F212. Furthermore, each of reference codes F2231 to F2232 represents processing corresponding to reprojection executed in response to the execution result of the processing F213. Furthermore, reference code F2251 represents processing corresponding to reprojection executed in response to the execution result of the processing F215.

Note that, in the example illustrated in FIG. 6, the processing illustrated AP and GPU is assumed to be executed at a rate of 60 Hz. Furthermore, as for the processing illustrated as Reprojection is set according to, for example, a refresh rate of an output unit. In the example illustrated in FIG. 6, the processing is assumed to be executed at the rate of 120 Hz. In other words, the processing corresponding to the reprojection can be executed at the timing (that is, display timing) when the display information is presented via the output unit. Note that a period during which the display information is continuously presented (that is, a period between the display timings adjacent to each other on the time axis) corresponds to an example of "second period". In other words, the processing corresponding to the reprojection can be executed every second period. Furthermore, the second period is set to be shorter than the above-mentioned first period (that is, the above-described frame). Furthermore, in the example illustrated in FIG. 6, a timing at which each processing is started is set at the rate of 120 Hz (that is, the timing is set as a timing of every 0.5 frames corresponding to the second period). In other words, the timing at which each processing is started between the timestamp ts=n and the timestamp ts=n+1 is a timing of one of the timestamps ts=n, ts=n+0.5, and ts=n+1.

Here, an outline of the series of processing illustrated as AP, GPU, and Reprojection will be described by taking processing executed from the timestamp ts=1 as a starting point, as an example. Specifically, the processing F201 is executed from the timing corresponding to the timestamp ts=1 as a starting point, and a scene graph corresponding to the timestamp ts=1 is determined or updated.

Note that, in the following description, a timing corresponding to the timestamp ts=n among timings at which a target scene is determined or update is illustrated as "Scene:n". That is, in the case where a scene is determined or updated at the timing corresponding to the timestamp ts=n, the scene graph corresponds to a scene graph corresponding to the timing "Scene:n". That is, the scene graph corresponding to the timing "Scene:1" can be obtained with execution of the processing F201.

Next, the processing F211 is executed in response to the execution result of the processing F201. That is, projection of the object according to the scene graph corresponding to the timing "Scene: 1" and drawing of the display information according to the result of the projection are executed. Note that the execution timing of the processing F211 is a timing corresponding to the timestamp ts=1.5 immediately after being delayed by at least a period associated with the execution of the processing F201 from the timing corresponding to the timestamp ts=1 among the timings of every 0.5 frames. Therefore, at the time of executing the processing F211, the object is projected according to the position or orientation of the viewpoint acquired at the timing corresponding to the timestamp ts=1.5 and the display information according to the result of the projection is drawn.

Note that, in the following description, a timing corresponding to the timestamp ts=n among timings at which the position or orientation of the viewpoint is determined with the execution of reprojection is illustrated as "View:n". That is, in a case where display information can be obtained as the results of the projection and the drawing according to the position or orientation of the viewpoint at the timing corresponding to the timestamp ts=n, the display information corresponds to display information corresponding to the timing "View:n". That is, in the processing F211, the display information corresponding to the timing "View:1.5" is obtained as a result of the projection or drawing according to the position or orientation of the viewpoint corresponding to the timestamp ts=1.5 on the basis of the scene graph corresponding to the timing "Scene:1".

Next, the processing F2211 corresponding to the reprojection is executed in response to the execution result of the processing F211. At this time, the execution timing of the processing F2211 is a timing corresponding to the timestamp ts=2 immediately after being delayed by at least a period associated with the execution of the processing F211 from the timing corresponding to the timestamp ts=1.5 at which execution of the processing F211 is started among the timings of every 0.5 frames. Therefore, in the processing F2211, the display information is corrected according to the execution result of the processing F211 in consideration of the delay of 0.5 frames due to the execution of the processing F211. That is, in the processing F2211, a scene graph corresponding to the timing "Scene:1.5" is assumed, and the display information is corrected according to the position or orientation of the viewpoint corresponding to the timestamp ts=2, whereby the display information corresponding to the timing "View:2" is obtained. That is, in this case, the display information corresponding to the timing "View:2" is presented to the user via the output unit.

Furthermore, at the timing 0.5 frames after the execution of the processing F2211, a new drawing result (that is, an execution result of the processing F212 executed after the processing F211) has not been obtained. Therefore, when the processing F2212 is executed, information between the display information according to the execution result by the processing F211 and the display information according to the execution result by the processing F212 is complemented. At this time, the execution timing of the processing F2212 is a timing corresponding to the timestamp ts=2.5 delayed by 0.5 frames from the timing corresponding to the timestamp ts=2 at which execution of the processing F2211 is started. Therefore, in the processing F2212, the scene graph corresponding to the timing "Scene:2" is assumed, and the display information is corrected according to the position or orientation of the viewpoint corresponding to the timestamp ts=2.5, whereby the display information corresponding to the timing "View:2.5" is obtained. That is, in this case, the display information corresponding to the timing "View:2.5" is presented to the user via the output unit.

Next, attention is paid to the processing F203 and F213 that are executed from the timestamp ts=3 as a starting point. The processing F203 has a high load on the processing regarding determination of the scene graph, such as a case where movement of the object is complicated, and the processing delay becomes larger than that of the other processing F201 and F202, for example. As a result, it becomes difficult to execute the processing F213 at the timing corresponding to the timestamp ts=3.5, and the timing at which the processing F213 is executed is delayed to the timing corresponding to the timestamp ts=4. That is, in the processing F213, the display information corresponding to the timing "View:4" is obtained as a result of the projection and the drawing according to the position or orientation of the viewpoint corresponding to the timestamp ts=4 on the basis of the scene graph corresponding to the timing "Scene:3".

Furthermore, the start timing of the processing F2231 corresponding to the reprojection in response to the execution result of the processing F213 is also delayed to the timing corresponding to the timestamp ts=5. Therefore, in the processing F2231, the display information is corrected according to the execution result of the processing F213 in consideration of the delay of 1 frame due to the execution of the processing F213. That is, in the processing F2231, a scene graph corresponding to the timing "Scene:4" is assumed, and the display information is corrected according to the position or orientation of the viewpoint corresponding to the timestamp ts=5, whereby the display information corresponding to the timing "View:5" is obtained. That is, in this case, the display information corresponding to the timing "View:5" is presented to the user via the output unit.

Meanwhile, at the timing corresponding to the timestamp ts=4.5, the execution of the processing F213 has not been completed, the processing F2224 is executed according to the execution result of the processing F212, and the display information according to the execution result of the processing F2224 is presented. Specifically, the timing at which the processing F2224 is executed is delayed by 2 frames from the start timing of the processing F212. Therefore, in the processing F2224, a scene graph corresponding to the timing "Scene:4" is assumed, and the display information is corrected according to the position or orientation of the viewpoint corresponding to the timestamp ts=4.5, whereby the display information corresponding to the timing "View:4.5" is obtained. That is, in this case, the display information corresponding to the timing "View:4.5" is presented to the user via the output unit.

Here, as can be seen by comparing the execution result of the processing F2224 and the execution result of the processing F2231, the display information assuming the scene graph corresponding to the timing "Scene: 4" is presented in both cases. That is, although continuity regarding the presentation of the display information is guaranteed between the timing "View:4.5" and the timing "View:5", some scenes are not updated. Therefore, for example, the user may perceive that a portion where the movement of the object is discontinuous has occurred.

Next, attention is paid to the processing F205 and F215 that are executed from the timestamp ts=5 as a starting point. The execution of the processing F205 and the processing F215 is completed within one frame as in the case of the processing F201 and the processing F211, and the processing F202 and the processing F212. That is, in the processing F215, the display information corresponding to the timing "View:5.5" is obtained as a result of the projection or drawing according to the position or orientation of the viewpoint corresponding to the timestamp ts=5.5 on the basis of the scene graph corresponding to the timing "Scene: 5". Furthermore, the start timing of the processing F2251 corresponding to the reprojection in response to the execution result of the processing F215 is the timing corresponding to the timestamp ts=6. That is, in the processing F2251, a scene graph corresponding to the timing "Scene:5.5" is assumed, and the display information is corrected according to the position or orientation of the viewpoint corresponding to the timestamp ts=6, whereby the display information corresponding to the timing "View:6" is obtained. That is, in this case, the display information corresponding to the timing "View:6" is presented to the user via the output unit.

Meanwhile, at the timing corresponding to the timestamp ts=5.5, the execution of the processing F215 has not been completed, the processing F2232 is executed according to the execution result of the processing F213, and the display information according to the execution result of the processing F2232 is presented. Specifically, the timing at which the processing F2232 is executed is delayed by 1.5 frames from the start timing of the processing F213. Therefore, in the processing F2232, a scene graph corresponding to the timing "Scene:4.5" is assumed, and the display information is corrected according to the position or orientation of the viewpoint corresponding to the timestamp ts=5.5, whereby the display information corresponding to the timing "View: 5.5" is obtained. That is, in this case, the display information corresponding to the timing "View:5.5" is presented to the user via the output unit.

Here, as can be seen by comparing the execution result of the processing F2231 and the execution result of the processing F2251, the display information is presented in such a manner that the scene graph corresponding to "Scene:4.5" jumps to the scene graph corresponding to "Scene:5.5". That is, although continuity regarding the presentation of the display information is guaranteed between the timing "View:5.5" and the timing "View:6", some scenes lack. Therefore, for example, the user may perceive that a portion where the movement of the object is discontinuous has occurred.

As described above, in the information processing system according to the comparative example, a portion where the movement of the object is discontinuous may occur at the timing at which pieces of the display information are displayed in succession, due to the influence of an increase in the processing load, for example.

(Example)

Figure 7:
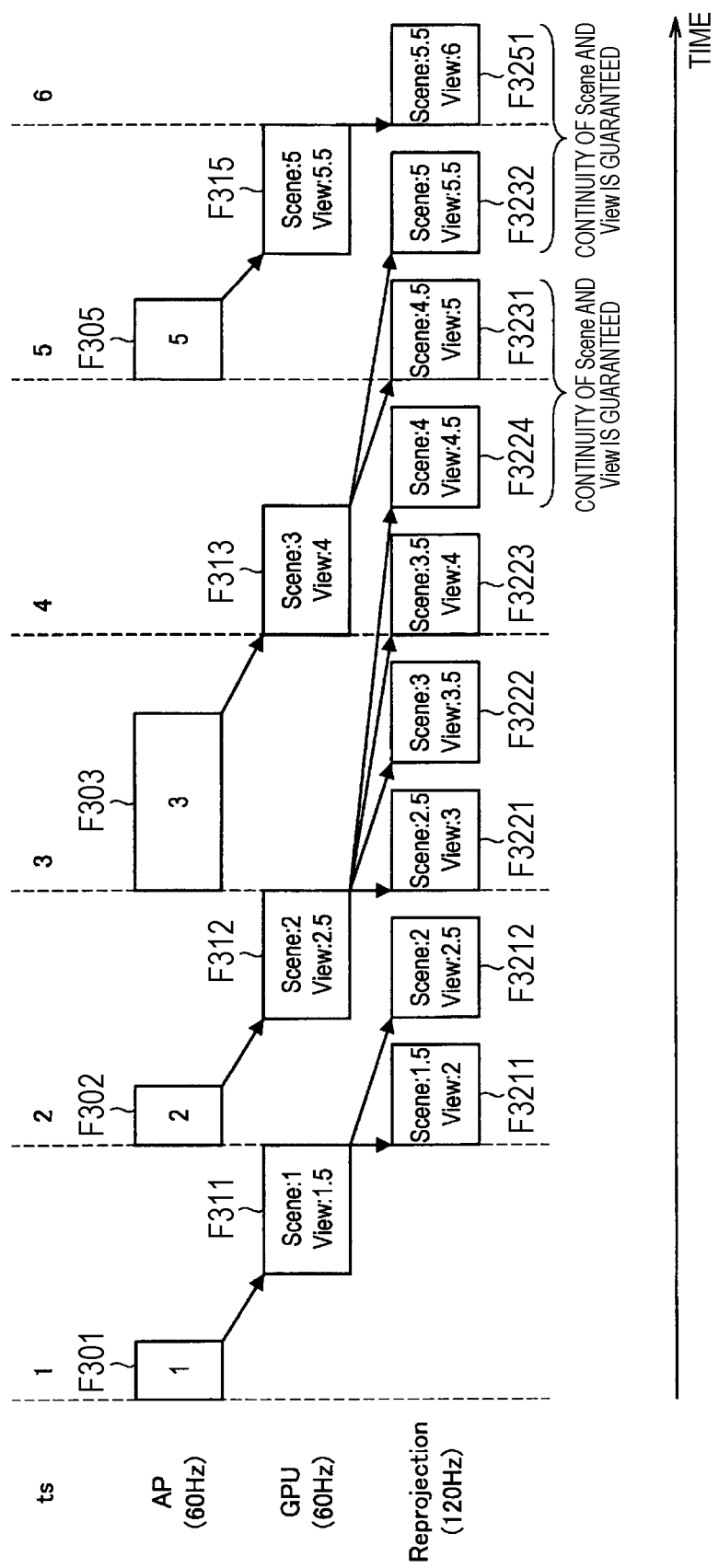
FIG. 7 is an explanatory diagram for describing a basic idea of technical characteristics of the information processing system according to the embodiment.

Next, the basic idea of the technical characteristics of the information processing system according to the present embodiment will be described using specific examples. For example, FIG. 7 is explanatory diagrams for describing the basic idea of the technical characteristics of the information processing system according to the present embodiment. In FIG. 7, the horizontal axis represents "time". Furthermore, in FIG. 7, processing represented as "ts", "GPU", and "Reprojection" is similar to the processing represented "ts", "GPU", and "Reprojection" illustrated in FIG. 6. Furthermore, in FIG. 7, processing F301, F302, F303, and F305 is similar to the processing F201, F202, F203, and F205 illustrated in FIG. 6. Furthermore, in FIG. 7, processing F311, F312, F313, and F315 is similar to the processing F211, F212, F213, and F215 illustrated in FIG. 6. Therefore, detailed description of the above processing similar to the example illustrated in FIG. 6 will be omitted.

Furthermore, in FIG. 7, processing F3211, F3212, F3221, F3222, F3223, F3224, F3231, F3232, and F3251 corresponds to the processing F2211, F2212, F2221, F2222, F2223, F2224, F2231, F2232, and F2251 illustrated in FIG. 6, respectively. Note that, hereinafter, the characteristics of the information processing system according to the present embodiment will be described mainly focusing on the relationship between the processing F3224 and the processing F3231, which corresponds to the portion where the movement of the object is discontinuous in the example in FIG. 6, and the relationship between the processing F3232 and the processing F3251. Specifically, hereinafter, the basic idea of the technical characteristics of the information processing system according to the present embodiment will be described mainly focusing on the processing F303, F313, F3231, and F3232, which is executed from the timestamp ts=3 as a starting point.

In the example illustrated in FIG. 6, in the processing F2231, only the delay of the processing F213 regarding the projection of the object and the drawing according to the projection result has been considered in estimating the scene graph at the time of correction (reprojection) of the display information. Therefore, for example, in a case where a delay occurs in the processing F203 regarding the determination or update of the scene graph, there may be case where the delay is not taken into consideration, and as a result, the display information is presented as if a portion where the movement of the object is discontinuous has occurred. In contrast, in the information processing system according to the present embodiment, the delay of the processing F303 regarding determination or update of a scene graph, the delay of the processing F313 regarding projection of an object according to a result of the processing F303 and drawing of the display information according to a result of the projection, and the like are taken into consideration in estimating (determining) the scene graph at the time of correcting (reprojecting) the display information.

Figure 8:
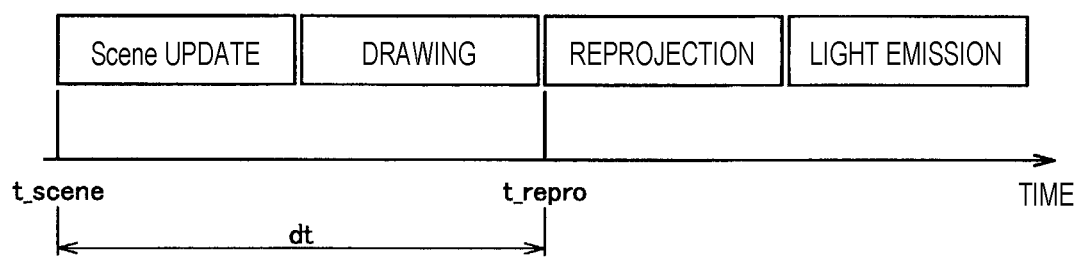
FIG. 8 is an explanatory diagram for describing a basic idea of technical characteristics of the information processing system according to the embodiment.

For example, FIG. 8 is an explanatory diagram for describing the basic idea of the technical characteristics of the information processing system according to the present embodiment, illustrating an outline of a method of calculating the delays taken into consideration at the time of correcting (reprojecting) the display information. In FIG. 8, the horizontal axis represents "time". That is, FIG. 8 schematically illustrates a situation in which a series of processing for presenting the target object as the display information is sequentially executed along the time axis. Specifically, the processing illustrated as "Scene update" schematically represents the processing regarding determination and update of a scene graph, and corresponds to, for example, the processing illustrated as "AP" in FIG. 7. The processing illustrated as "drawing" schematically illustrates the processing regarding projection of the object and drawing of the display information according to a result of the projection, and corresponds to, for example, the processing illustrated as "GPU" in FIG. 7. The processing illustrated as "reprojection" schematically illustrates the processing regarding correction of the display information according to a result of the drawing (that is, reprojection), and corresponds to, for example, the processing illustrated as "Reprojection" in FIG. 7. Furthermore, the processing illustrated as "light emission" schematically illustrates the processing regarding presentation of the display information via the output unit, such as processing regarding light emission of a light emitting body such as a backlight of a display.

Furthermore, in FIG. 8, the period illustrated as dt schematically illustrates the delay taken into consideration in estimating the scene graph at the time of correcting (reprojecting) the display information. Specifically, the timing t_scene represents the start timing of the processing illustrated as "Scene update". Furthermore, the timing t_repro represents the start timing of the processing illustrated as "reprojection". That is, in the information processing system according to the present embodiment, the scene graph at the time of correction is estimated in consideration of the delay of the processing illustrated as "Scene update" and "drawing" in executing the processing regarding correction of the display information illustrated as "reprojection".

That is, the delay dt can be expressed by the calculation formula given as the expression (1) below. In the following expression (1), t_scene and t_repro are as described with reference to FIG. 8. Furthermore, offset represents an offset that can be applied in calculating the delay dt, and can be applied in consideration of the load on the system, for example. Note that in a case where the offset is not taken into consideration, the offset=0 is simply set.

[Math. 1]

$$dt = t\_repro - t\_scene - \text{offset} \qquad (1)$$

As a specific example, in the example illustrated in FIG. 7, in the processing F3231, in correcting the display information according to the execution result of the processing F313, a scene graph at the time of correction is estimated in consideration of the delay in the processing F303 and the processing F313. More specifically, there is a delay of 2 frames between the timing at which execution of the processing F303 is started (that is, the timing corresponding to the timestamp ts=3) and the timing at which execution of the processing F3231 is started (the timing corresponding to the timestamp ts=5). Furthermore, in the example illustrated in FIG. 7, 0.5 frames are taken into consideration as an offset in calculating the delay dt. That is, the delay dt considered for the estimation of the scene graph is 1.5 frames in executing the processing F3231. Thereby, in the processing F3231, a scene graph corresponding to the timing "Scene: 4.5" is assumed, and the display information is corrected according to the position or orientation of the viewpoint corresponding to the timestamp ts=5, whereby the display information corresponding to the timing "View:5" is obtained.

Furthermore, in the processing F3224, in correcting the display information according to the execution result of the processing F312, a scene graph at the time of correction is estimated in consideration of the delay in the processing F302 and the processing F312. More specifically, there is a delay of 2.5 frames between the timing at which execution of the processing F302 is started (that is, the timing corresponding to the timestamp ts=2) and the timing at which execution of the processing F3224 is started (the timing corresponding to the timestamp ts=4.5). Furthermore, as described above, 0.5 frames are taken into consideration as an offset in calculating the delay dt. That is, the delay dt considered for the estimation of the scene graph is 2 frames in executing the processing F3224. Thereby, in the processing F3224, a scene graph corresponding to the timing "Scene:4" is assumed, and the display information is corrected according to the position or orientation of the viewpoint corresponding to the timestamp ts=4.5, whereby the display information corresponding to the timing "View:4.5" is obtained.

Here, as can be seen from a comparison between the execution result of the processing F3224 and the execution result of the processing F3231, the difference between the scene graphs is 0.5 frames, which matches 0.5 frames as a difference between timings when the position or orientation of the viewpoint has been determined. From the above fact, it can be seen that the correction (reprojection) of the display information is controlled to maintain the continuity of the scenes between the execution result of the processing F3224 and the execution result of the processing F3231 (the continuity of the movement of the object, for example).

Furthermore, as another example, in the processing F3232, in correcting the display information according to the execution result of the processing F313, a scene graph at the time of correction is estimated in consideration of the delay in the processing F303 and the processing F313. More specifically, there is a delay of 2.5 frames between the timing at which execution of the processing F303 is started (that is, the timing corresponding to the timestamp ts=3) and the timing at which execution of the processing F3232 is started (the timing corresponding to the timestamp ts=5.5). Furthermore, as described above, 0.5 frames are taken into consideration as an offset in calculating the delay dt. That is, the delay dt considered for the estimation of the scene graph is 2 frames in executing the processing F3232. Thereby, in the processing F3232, a scene graph corresponding to the timing "Scene:5" is assumed, and the display information is corrected according to the position or orientation of the viewpoint corresponding to the timestamp ts=5.5, whereby the display information corresponding to the timing "View:5.5" is obtained.

Furthermore, in the processing F3251, in correcting the display information according to the execution result of the processing F315, a scene graph at the time of correction is estimated in consideration of the delay in the processing F305 and the processing F315. More specifically, there is a delay of 1 frame between the timing at which execution of the processing F305 is started (that is, the timing corresponding to the timestamp ts=5) and the timing at which execution of the processing F3251 is started (the timing corresponding to the timestamp ts=6). Furthermore, as described above, 0.5 frames are taken into consideration as an offset in calculating the delay dt. That is, the delay dt considered for the estimation of the scene graph is 0.5 frames in executing the processing F3251. Thereby, in the processing F3251, a scene graph corresponding to the timing "Scene:5.5" is assumed, and the display information is corrected according to the position or orientation of the viewpoint corresponding to the timestamp ts=6, whereby the display information corresponding to the timing "View:6" is obtained.

Here, as can be seen from a comparison between the execution result of the processing F3232 and the execution result of the processing F3251, the difference between the scene graphs is 0.5 frames, which matches 0.5 frames as a difference between timings when the position or orientation of the viewpoint has been determined. From the above fact, it can be seen that the correction (reprojection) of the display information is controlled to maintain the continuity of the scenes between the execution result of the processing F3232 and the execution result of the processing F3251 (the continuity of the movement of the object, for example).

As described above, the information processing system according to the present embodiment controls the correction of the display information to maintain the continuity of the scenes among a plurality of pieces of display information according to the projection results different from one another (for example, the continuity according to the movement of the object) in the case of continuously displaying the plurality of pieces of display information.

Note that, in the case of focusing on the relationship between the processing F3224 and the processing F3231, the display information displayed according to the antecedently executed processing F3224 corresponds to an example of "first display information", and the timing at which the first display information is displayed corresponds to an example of "first display timing". Furthermore, the projection result of the object corresponding to the processing F312, which is the correction target of the processing F3224, corresponds to an example of "first projection result". That is, among the execution timings of the processing F312, the timing at which the processing regarding the projection of the object is executed corresponds to an example of "first projection timing". Furthermore, the display information displayed according to the processing F3231 executed next corresponds to an example of "second display information", and the timing at which the first display information is displayed corresponds to an example of "second display timing". In this case, the projection result of the object corresponding to the processing F313, which is the correction target of the processing F3231, corresponds to an example of "second projection result". That is, among the execution timings of the processing F313, the timing at which the processing regarding the projection of the object is executed corresponds to an example of the "second projection timing". As described above, between the processing F312 and the processing F313 regarding the projection and drawing of an object executed in sequence, the result of the projection according to the processing F312, which is antecedently executed, corresponds to an example of a "first projection result", and the result of the projection according to the processing F313, which is executed next, corresponds to an example of a "second projection result". Furthermore, the "first display timing" and the "second display timing" are display timings adjacent to each other on the time axis, and correspond to the timings at which the "first display information" and the "second display information" according to the projection results different from each other are displayed. That is, the information processing system according to the present embodiment controls the correction of the second display information to maintain the continuity (scene continuity) according to the movement of the object between the first display information and the second display information. This similarly applies to other examples in which a plurality of pieces of display information according to the projection results different from each other is continuously displayed (for example, the relationship between the processing F3212 and F3221 and the relationship between the processing F3232 and F3251) in the example illustrated in FIG. 7.

(Application of Correction)

Next, application of the correction of the display information by the information processing system according to the present embodiment will be described using specific examples. Note that, in the present description, to make the technical characteristics of the information processing system according to the present embodiment easier to understand, a case of correcting the presentation position of the display information according to the projection result of the target object, assuming that the object is performing constant velocity linear motion, will be described.

Figure 9:
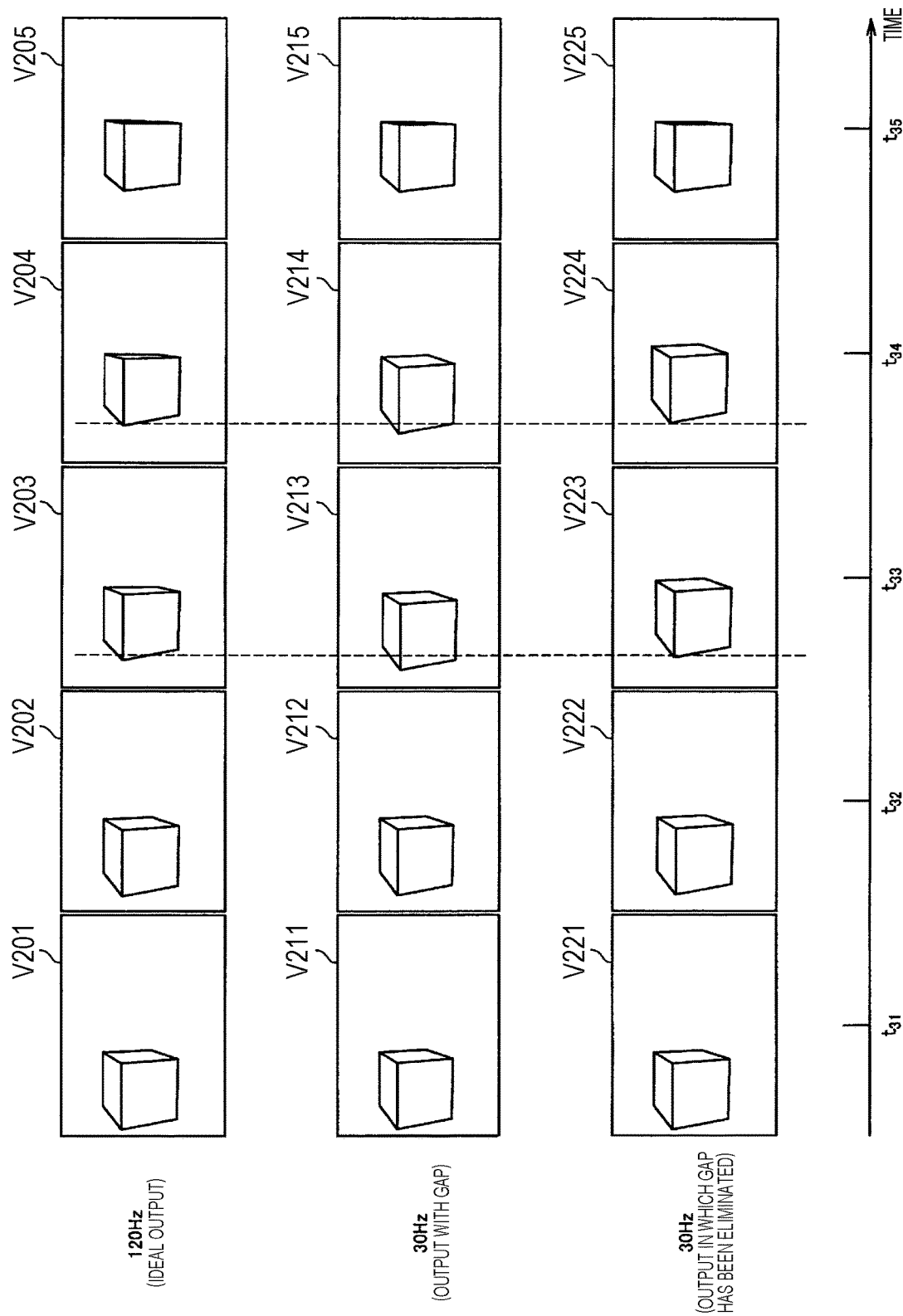
FIG. 9 is an explanatory diagram for describing an outline of technical characteristics of the information processing system according to the embodiment.

For example, FIG. 9 is an explanatory diagram for describing the outline of the technical characteristics of the information processing system according to the present embodiment, illustrating an example of a presentation mode for the display information according to an application result of the correction of the display information. Specifically, in the example illustrated in FIG. 9, as examples of the display information presentation mode, "ideal output", "output with a gap", and "output in which the gap has been eliminated" are chronologically presented in a comparable manner.

Note that, in the example illustrated in FIG. 9, "ideal output" is similar to the "ideal output" in the example described with reference to FIG. 4. That is, in a case where the processing regarding the projection of the object and the drawing according to a result of the projection can be executed at the refresh rate of 120 Hz, a video in which the display information according to the result of the projection and the drawing is presented is illustrated. Furthermore, the "output with a gap" indicates an example of a video of the case in which the user perceives that a portion where the movement of the object is discontinuous has occurred, as in the example described with reference to FIG. 6. In contrast, the "output in which the gap has been eliminated" indicates an example of a video in which the display information is presented according to a control result of the correction of the display information by the information processing system according to the present embodiment, as in the example described with reference to FIG. 7.

Furthermore, in FIG. 9, the horizontal axis represents time, and reference codes t31 to t35 represent timings chronologically arranged in this order. More specifically, in the example illustrated in FIG. 9, each of the timings t31 to t35 schematically represents each timing at which information is presented to the output unit at the refresh rate of 120 Hz.

In FIG. 9, reference codes V201 to V205 schematically represent images respectively presented at the timings t31 to t35 in the case where the ideal output is performed. That is, in the case of the ideal output, at each of the timings t31 to t35, the projection result of the object according to the relative position or orientation relationship between the viewpoint and the object at that time is presented as the display information.

Furthermore, reference codes V211 to V215 schematically represent images respectively presented at the timings t31 to t35 in the case where the output with a gap is performed. As can be seen by comparing the output with a gap with the ideal output, gaps have occurred in the presentation position of the display information at the timings t33 and t34 in the case of the output with a gap, as compared with the case of the ideal output. Such gaps may become apparent, for example, due to the processing described with reference to FIG. 6.

In contrast, reference codes V221 to V225 schematically represent images respectively presented at the timings t31 to t35 in the case where the output in which the gap has been eliminated is performed. As can be seen by comparing the output in which the gap has been eliminated with the ideal output, the correction is controlled such that the presentation position of the object substantially coincides with the ideal output at any of the timings t31 to t35 in the case of the output in which the gap has been eliminated.

Note that, in the example illustrated in FIG. 9, among the changes according to the movement of the object (for example, the changes in the presentation position, orientation, size, and the like of the object), only the presentation position of the display information is corrected according to the position and orientation of the viewpoint of the time. Therefore, at the timings t32 to t34, for example, the orientation of the object does not change from the state presented as the image V221 at the timing t31. That is, the information processing system according to the present embodiment controls the correction of the display information between the image V223 and the image V224 so as to substantially coincide with the change in a component related to the correction (that is, the change in the presentation position of the display information) among the changes according to the movement of the object between the timings t33 and t34 (in other words, the difference between the image V203 and the image V204), for example. Note that, in this case, the display information presented to the image V223 corresponds to an example of the "first display information", and the display information presented to the image V224 corresponds to an example of the "second display information". That is, in the example illustrated in FIG. 9, the presentation position of the second display information is determined on the basis of the first display information for which the reprojection processing has been performed in accordance with the display timing (first display timing) immediately before the display timing (second display timing) of the second display information. In other words, the presentation position of the second display information is determined on the basis of the timestamp of the first display information (that is, the timing indicated by View:N) at which the reprojection processing has been performed.

Furthermore, in the example illustrated in FIG. 9, an example of the case where the presentation position of the display information according to the projection result of the object is corrected according to the movement of the object has been described. However, the component to be corrected is not necessarily limited. As a specific example, components such as the orientation of the display information according to the projection result of the object, the size of the display information, the color of the display information, and the brightness of the display information may be component to be corrected (reprojection). As a more specific example, the orientation of the display information may be corrected by rotating the display information according to the projection result of the object according to the movement of the object. Furthermore, as another example, the size of the display information may be corrected by enlarging or reducing the display information according to the projection result of the object according to the movement of the object. Furthermore, as another example, the color and brightness of the display information according to the projection result of the object may be corrected according to the movement of the object.

By the above control, the situation in which the display information is presented as if a portion where the movement of the object is discontinuous has occurred as described with reference to FIGS. 5 and 6 can be suppressed from becoming apparent in presenting the object with movement as the display information. That is, the information processing system according to an embodiment of the present disclosure can present a video in which the movement of an object to be presented is shown in a more natural manner, even under the situation where the object has movement.

As described above, the basic idea of the technique in which the information processing system 1 according to an embodiment of the present suppresses a situation in which the display information is presented as if a portion where the movement of the object is discontinuous has occurred from becoming apparent, has been described with reference to FIGS. 6 to 9.

<3.2. Functional Configuration>

Figure 10:
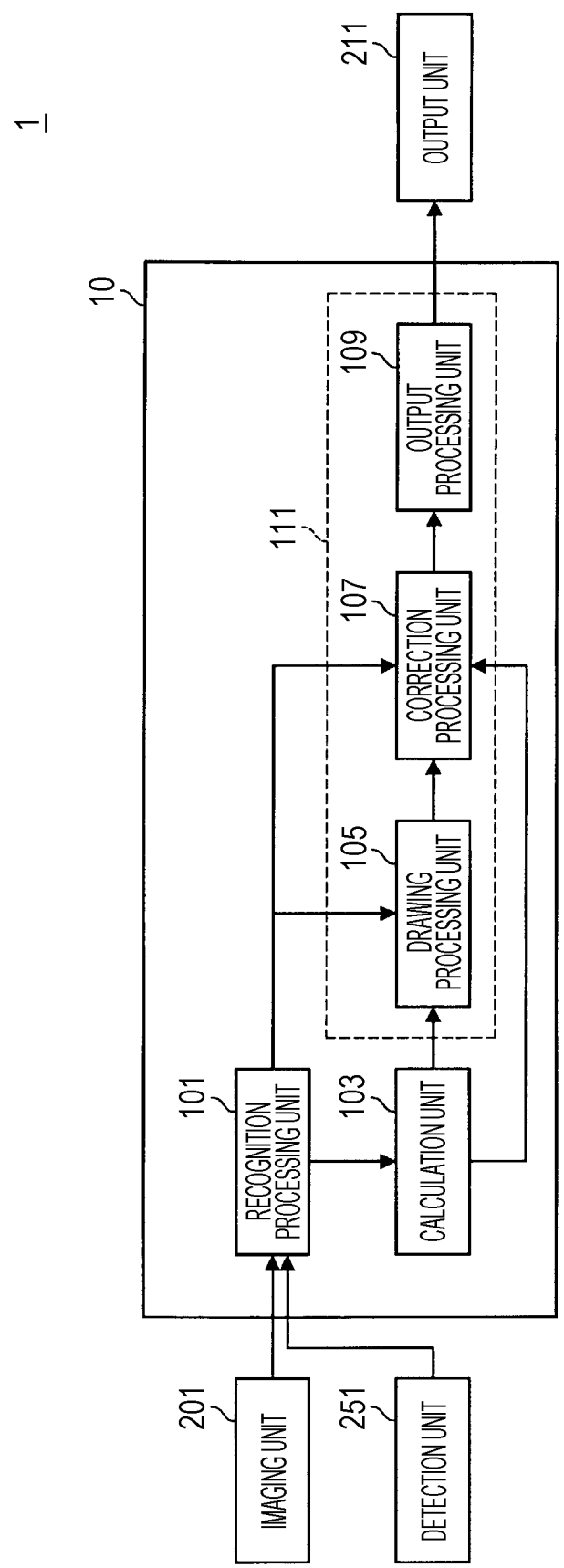
FIG. 10 is a block diagram illustrating an example of a functional configuration of the information processing system according to the embodiment.

Next, an example of a functional configuration of the information processing system according to the embodiment of the present disclosure will be described with reference to FIG. 10. FIG. 10 is a block diagram illustrating an example of a functional configuration of the information processing system according to the present embodiment. Specifically, FIG. 10 illustrates an example of a functional configuration of the information processing system 1 illustrated in FIG. 1, in particular, focusing on the configuration in which the information processing apparatus 10 presents information to the user via the output unit 211 of the input/output device 20 according to the change in the position or orientation of the input/output device 20.

As illustrated in FIG. 10, the information processing system 1 according to the present embodiment includes an imaging unit 201, an output unit 211, a detection unit 251, and the information processing apparatus 10. Note that the output unit 211 corresponds to, for example, the output unit 211 described with reference to FIG. 2.

The imaging unit 201 corresponds to the first imaging units 201a and 201b configured as the stereo camera in FIG. 2. The imaging unit 201 captures an image of an object (subject) in the real space and outputs the captured image to the information processing apparatus 10.

The detection unit 251 schematically illustrates a portion regarding acquisition of information for detecting a change in the position or orientation of the input/output device 20 (and thus the movement of the head of the user wearing the input/output device 20). In other words, the detection unit 251 acquires information for detecting the change in the position or orientation of the viewpoint (in other words, the change in the position or orientation of the input/output device 20). As a specific example, the detection unit 251 may include various sensors related to detection of movement of an object, such as an acceleration sensor and an angular velocity sensor. The detection unit 251 outputs the acquired information to the information processing apparatus 10. Thereby, the information processing apparatus 10 can recognize the change in the position or orientation of the input/output device 20.

Next, the configuration of the information processing apparatus 10 will be described. As illustrated in FIG. 10, the information processing apparatus 10 includes a recognition processing unit 101, a calculation unit 103, a drawing processing unit 105, a correction processing unit 107, and an output control unit 109.

The recognition processing unit 101 acquires the image captured by the imaging unit 201, and applies analysis processing to the acquired image, thereby recognizing the object (subject) in the real space captured in the image. As a specific example, the recognition processing unit 101 acquires images captured from a plurality of different viewpoints (hereinafter also referred to as "stereo images") from the imaging unit 201 configured as a stereo camera, and measures the distance to the object captured in the image for each pixel of the image on the basis of the parallax between the acquired images. Thereby, the recognition processing unit 101 can estimate or recognize the relative positional relationship in the real space (in particular, the positional relationship in the depth direction) between the imaging unit 201 (and thus the input/output device 20) and each object captured in the image at the timing at which the image is captured. The above is merely an example, and the method and the configuration therefor are not particularly limited as long as an object in the real space can be recognized. That is, the configuration of the imaging unit 201 and the like may be changed as appropriate according to the method of recognizing an object in the real space.

Furthermore, the recognition processing unit 101 may recognize the position or orientation of the viewpoint on the basis of the technology of self-position estimation, for example. As a specific example, the recognition processing unit 101 may perform self-position estimation and environment map creation on the basis of SLAM, thereby recognizing the positional relationship between the input/output device 20 (in other words, the viewpoint) and the object captured in the image in the real space. In this case, the recognition processing unit 101 may acquire information regarding the detection result of the change in the position and orientation of the input/output device 20 from the detection unit 251, and use the acquired information for the self-position estimation based on SLAM, for example. Note that the above is merely an example, and the method and the configuration therefor are not particularly limited as long as the position or orientation of the viewpoint can be recognized. That is, the configuration of the imaging unit 201, the detection unit 251, or the like may be changed as appropriate according to the method of recognizing the position or orientation of the viewpoint.

Then, the recognition processing unit 101 outputs information regarding the result of the self-position estimation of the input/output device 20 (that is, the recognition result of the position or orientation of the viewpoint) to the calculation unit 103, the drawing processing unit 105, and the correction processing unit 107 to be described below. Note that, since the information regarding the result of self-position estimation is sequentially acquired, the change in the position or orientation of the input/output device 20 (that is, the change in the position or orientation of the viewpoint) can be recognized, for example.

Furthermore, the recognition processing unit 101 may recognize the position in the real space of each object (that is, the real object) captured in the image, and output information regarding the recognition result to the calculation unit 103, the drawing processing unit 105, and the correction processing unit 107. As a specific example, the recognition processing unit 101 may output information (that is, depth map) indicating the depth (the distance to the object) measured for each pixel in the image to the calculation unit 103, the drawing processing unit 105, and the correction processing unit 107. Thereby, the calculation unit 103, the drawing processing unit 105, and the correction processing unit 107 can recognize the object in the real space on the basis of the information.

Note that the method of measuring the distance to the subject is not limited to the above-described measuring method based on a stereo image. Therefore, the configuration corresponding to the imaging unit 201 may be appropriately changed according to the distance measuring method. As a specific example, in the case of measuring the distance to the subject based on TOF, a light source for projecting an infrared light and a light-receiving element for detecting the infrared light projected from the light source and reflected at the subject may be provided instead of the imaging unit 201. Furthermore, when measuring the distance to the object, a plurality of measuring methods may be used. In this case, a configuration for acquiring information to be used for the measurement may be provided in the input/output device 20 or the information processing apparatus 10 according to the measuring method to be used. Of course, it goes without saying that the content of the information (for example, the depth map) indicating the recognition result of the position in the real space of each object captured in the image may be appropriately changed according to the applied measuring method.

As described above, the recognition processing unit 101 sequentially recognizes the position or orientation of the viewpoint, and outputs the information regarding the recognition result of the position or orientation of the viewpoint (in other words, information regarding the movement of the viewpoint) to the calculation unit 103, the drawing processing unit 105, and the correction processing unit 107 to be described below.

The calculation unit 103 determines or updates the position, orientation, and movement (for example, a moving direction and speed) of an object to be presented as the display information (for example, a virtual object) with execution of a predetermined function such as an application. In other words, the calculation unit 103 determines or updates the scene graph. At this time, the calculation unit 103 may acquire the information regarding the recognition result of the position or orientation of the viewpoint from the recognition processing unit 101, and determine or update the position, orientation, movement, and the like of the target object on the basis of the information. As a more specific example, the calculation unit 103 may determine or update the position, orientation, movement, and the like of the target object according to the relative position or orientation relationship between the viewpoint and the object on the basis of the information acquired from the recognition processing unit 101.

Furthermore, the calculation unit 103 may acquire information regarding a recognition result of an object in the real space from the recognition processing unit 101, and determine or update the position, orientation, movement, and the like of the target object on the basis of the information. As a more specific example, the calculation unit 103 may determine or update the position, orientation, movement, and the like of the target object according to the relative position or orientation relationship between the object in the real space and the target object on the basis of the information acquired from the recognition processing unit 101. Furthermore, at this time, as described above, the calculation unit 103 may determine or update the position, orientation, movement, or the like of the target object in consideration of the position or orientation of the viewpoint.

Then, the calculation unit 103 outputs information regarding the determined or updated position, orientation, movement, and the like (hereinafter, also referred to as "scene graph" for convenience) of the object to the drawing processing unit 105 located in the subsequent stage. Furthermore, the calculation unit 103 provides at least information regarding the determined or updated movement of the object and information regarding the timing at which the movement of the object has been determined (in other words, the timing at which the scene graph has been determined) of the information regarding the determined or updated scene graph to the correction processing unit 107 to be described below.

The drawing processing unit 105 acquires the information regarding the determined or updated scene graph from the calculation unit 103. Furthermore, the drawing processing unit 105 acquires the information regarding the recognition result of the position or orientation of the viewpoint (for example, the information regarding the result of self-position estimation) from the recognition processing unit 101. The drawing processing unit 105 draws the target object as the display information in a predetermined buffer (for example, frame buffer) according to the position or orientation of the viewpoint based on the information acquired from the recognition processing unit 101 and the position, orientation, movement, and the like of the object based on the information acquired from the calculation unit 103. Specifically, the drawing processing unit 105 projects the target object (for example, the virtual object having three-dimensional information) in the display region according to the relative position or orientation relationship between the viewpoint and the object. Then, the drawing processing unit 105 draws the display information (that is, two-dimensional display information) according to the result of the projection in the buffer.

Furthermore, the drawing processing unit 105 may acquire information regarding a recognition result of the position of an object in the real space from the recognition processing unit 101. In this case, for example, the drawing processing unit 105 may draw the display information according to the recognition result of the object (real object) in the real space. As a specific example, the drawing processing unit 105 may project an object to be presented onto the display region according to the relative position or orientation relationship between the object in the real space and the object, and draw display information according to a result of the projection in the buffer.

Furthermore, the drawing processing unit 105 may control the color and brightness of the display information drawn in the buffer according to various conditions. As a specific example, when projecting a target object on the display region, the drawing processing unit 105 may control the color and brightness of the object to be drawn as the display information according to a positional relationship between a light source defined in a three-dimensional space and the object. Furthermore, in a case of presenting the display information to be superimposed on an object in the real space on the basis of the AR technology, the drawing processing unit 105 may control the color and brightness of the display information to be drawn according to the positional relationship between the object and the display information.

The correction processing unit 107 applies various types of correction to the display information drawn in the buffer by the drawing processing unit 105. For example, the correction processing unit 107 performs correction (so-called reprojection) of the display information according to the change in the position or orientation of the viewpoint until the display information drawn in the buffer by the drawing processing unit 105 is presented to the output unit 211 by the output control unit 109 to be described below. In this case, the correction processing unit 107 may acquire the information regarding the recognition result of the position or orientation of the viewpoint from the recognition processing unit 101, for example, and use the information for the correction.

Furthermore, the correction processing unit 107 may control the correction in consideration of the movement of the object. Furthermore, the correction processing unit 107 acquires at least the information regarding the movement of the object (for example, the information regarding the moving direction and speed of the object) and the information regarding the timing at which the movement of the object has been determined (in other words, the timing at which the scene graph has been determined) of the information regarding the determined or updated scene graph from the calculation unit 103. Note that the information regarding the movement of the object corresponds to an example of "first information". Furthermore, the timing at which the movement of the object has been determined corresponds to an example of "first timing" and the information regarding the timing corresponds to an example of "second information".

Next, the correction processing unit 107 calculates the delay dt between the timing at which the movement of the object is determined and the timing at which execution of the correction is started, as described above with reference to FIG. 8. Note that the timing at which execution of the correction is started corresponds to an example of "second timing".

Then, the correction processing unit 107 presumes the changes according to the movement of the object (for example, the changes in the presentation position, orientation, size, color, brightness, and the like of the object) on the basis of the information regarding the movement of the object and the calculation result of the delay dt, and controls the correction of the display information according to a result of the presumption.

Here, an example of a method of calculating the presentation position of the display information after correction in a case where the correction processing unit 107 corrects the presentation position of the display information will be described. Note that, in the present description, to more simplify the description, an example of a method of calculating the presentation position of an object after correction will be described assuming that the object moves in an x direction (for example, the horizontal direction as viewed from the viewpoint). Specifically, a presentation position x' of the object after correction considering the delay dt is expressed by the calculation formula given as the expression (2) below, where the presentation position of the object before correction is x, and the speed of the object along the x direction is v.

[Math. 2]

$$x' = x + v \times t \quad (2)$$

Note that the above expression (2) expresses the case where the object is performing a constant velocity linear motion in the x direction, but correction content and parameters used for the correction can be appropriately changed according to the movement of the object.

As a specific example, in a case where the speed of the object changes, the correction processing unit 107 is only required to acquire the information regarding a change in the speed (that is, acceleration) of the object as the information regarding the movement of the object from the calculation unit 103, for example. Furthermore, in a case of two-dimensionally correcting the presentation position of the display information, the correction processing unit 107 is only required to acquire information regarding two-dimensional movement of the object and information indicating the movement of the object by vectors as the information regarding the movement of the object from the calculation unit 103, for example.

Furthermore, as described above, the above correction is not necessarily limited to the correction of the presentation position of the display information, and for example, the orientation of the display information, the size of the display information, the color of the display information, the brightness of the display information, or the like may be corrected, for example. As a specific example, in the case of correcting the orientation of the display information, the correction processing unit 107 is only required to acquire information regarding a rotating direction of the object or information regarding the speed of rotation (for example, angular velocity) as the information regarding the movement of the object from the calculation unit 103, for example. Furthermore, in the case of correcting the size of the display information, the correction processing unit 107 is only required to acquire information that can be a factor of enlargement or reduction of the display information according to the projection result of the object as the information regarding the movement of the object from the calculation unit 103. As a specific example, in a case where the display information is visually recognized to be enlarged as the object approaches the viewpoint, the correction processing unit 107 is only required to acquire information regarding the speed of the object approaching the viewpoint (that is, the speed of the movement in a depth direction of the object) from the calculation unit 103, for example. Furthermore, in a case where the object itself is enlarged or reduced, the correction processing unit 107 is only required to acquire information regarding the speed at which the object is enlarged or reduced from the calculation unit 103, for example. Furthermore, in the case of correcting the color or brightness of the object, the correction processing unit 107 is only required to acquire information regarding a change in the color or brightness of the object as the information regarding the movement of the object from the calculation unit 103. Note that examples of the information regarding the change in the color or brightness of the object include information regarding a direction in which the color or brightness changes, and information regarding the speed of the change. Furthermore, as another example, information that can be a factor for the change in the color or brightness of the object, such as information regarding a change in a positional relationship between the object and a light source, or information regarding a change in light intensity from the light source may be used.

When various corrections have been performed for the display information drawn in the buffer by the correction processing unit 107 as described above, the output control unit 109 causes the output unit 211 to display the corrected display information held in the buffer in time with the display timing of the information in the output unit 211.

Note that, for example, the processing block (that is, the processing block including the drawing processing unit 105, the correction processing unit 107, and the output control unit 109) illustrated with reference code 111, in the functional configuration of the information processing system 1 illustrated in FIG. 10, corresponds to an example of "control unit" that causes the display information to be displayed in the display region of the output unit 211. Furthermore, the portion that acquires the information regarding the movement of the viewpoint from the recognition processing unit 101 and the portion that acquires the information regarding the movement of the object from the calculation unit 103, of the processing block 111, correspond to an example of "acquisition unit".

Note that the functional configurations of the information processing system 1 illustrated in FIG. 10 are mere examples, and the functional configurations of the information processing system 1 are not necessarily limited to the example illustrated in FIG. 10 as long as the operation of the above-described configurations can be implemented. As a specific example, at least one of the imaging unit 201, the detection unit 251, or the output unit 211 may be integrally configured with the information processing apparatus 10.

Furthermore, as another example, some functions of the information processing apparatus 10 may be provided outside the information processing apparatus 10. As a specific example, the portion corresponding to the recognition processing unit 101 or the calculation unit 103 may be provided outside the information processing apparatus 10. Note that, in this case, an interface that acquires information from the portion corresponding to the recognition processing unit 101 or the calculation unit 103 provided outside the information processing apparatus 10 can correspond to an example of the "acquisition unit". Furthermore, at least some functions of the information processing apparatus 10 may be implemented by a plurality of devices operating in cooperation with one another.

An example of a functional configuration of the information processing system according to the embodiment of the present disclosure has been described with reference to FIG. 10.

<3.3. Processing>

Next, an example of a flow of the series of processing of the information processing system 1 according to the embodiment of the present disclosure will be described, in particular, focusing on the operation of the information processing apparatus 10 illustrated in FIG. 1. For example, FIG. 11 is a flowchart illustrating an example of a flow of the series of processing of the information processing system 1 according to the present embodiment, and illustrates an example of a flow of the processing in which the information processing apparatus 10 causes the display information to be presented in the display region according to the recognition result of the position or orientation of the viewpoint.

Figure 11:
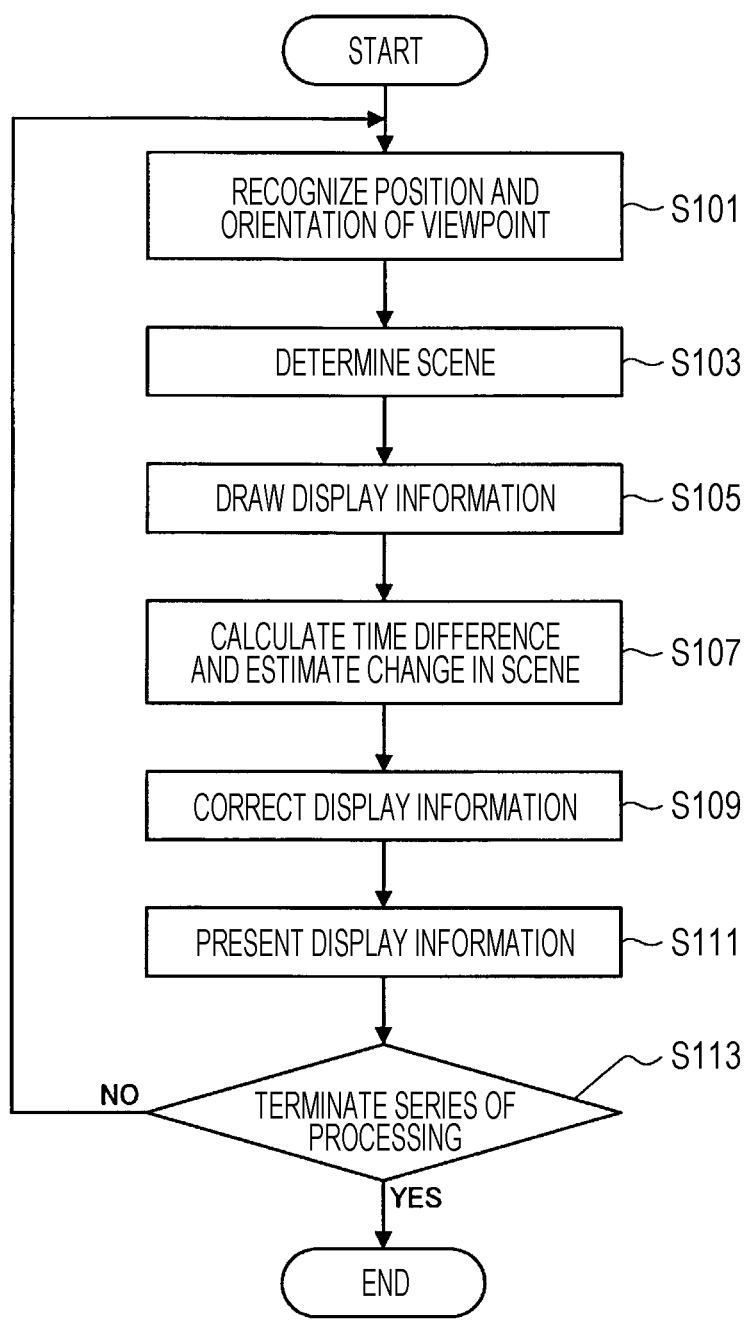
FIG. 11 is a flowchart illustrating an example of a flow of a series of processing of the information processing system 1 according to the embodiment.

As illustrated in FIG. 11, the information processing apparatus 10 (recognition processing unit 101) recognizes at least one of the position or orientation of the viewpoint on the basis of the information regarding the imaging result of the image by the imaging unit 201 and the detection result of the change in the position or orientation of the input/output device 20 by the detection unit 251. The self-position estimation technology such as SLAM may be used for the recognition of the position or orientation of the viewpoint, for example. As described above, the information processing apparatus 10 can recognize the movement of the viewpoint (that is, the change in the position and orientation of the viewpoint) by sequentially recognizing the position and orientation of the viewpoint (S101).

Next, the information processing apparatus 10 (calculation unit 103) determines or updates the scene graph (in particular, determines or updates the movement of the object) with the execution of a predetermined function such as an application. As a more specific example, the information processing apparatus 10 may determine or update the position, orientation, movement, and the like of the target object according to the relative position or orientation relationship between the viewpoint and the object on the basis of the recognition result of the position or orientation of the viewpoint and autonomous movement of the object (S103).

Next, the information processing apparatus 10 (drawing processing unit 105) draws the target object in a predetermined buffer (for example, a frame buffer) as the display information on the basis of the result of the determination or update of the scene graph and the recognition result of the position or orientation of the viewpoint. Specifically, the information processing apparatus 10 projects the target object (for example, the virtual object having three-dimensional information) in the display region according to the relative position or orientation relationship between the viewpoint and the object. Then, the information processing apparatus 10 draws display information (that is, two-dimensional display information) according to the result of the projection in the buffer (S105).

Next, the information processing apparatus 10 (correction processing unit 107) performs correction (so-called reprojection) of the display information drawn in the buffer according to the change in the position or orientation of the viewpoint until the display information is presented to the output unit 211. At this time, the information processing apparatus 10 may control the correction in consideration of the movement of the object.

Specifically, the information processing apparatus 10 calculates a time difference (that is, the delay dt) between the timing at which the movement of the object has been determined and the timing at which execution of the correction is started. Furthermore, the information processing apparatus 10 presumes the changes according to the movement of the object (for example, corresponding to the changes in the presentation position, orientation, size, and the like of the object, in other words, the change in the scene) on the basis of the information regarding the movement of the object and the calculation result of the time difference (S107). Then, the information processing apparatus 10 controls the correction of the display information according to the resumption result of the change in the scene (S109).

Then, the information processing apparatus 10 (output control unit 109) causes the output unit 211 to display the corrected display information held in the buffer in time with the display timing of information to the output unit 211 (for example, the light emission timing of the output unit 211). As a result, the display information is presented to the user via the output unit 211 (S111).

As described above, the information processing apparatus 10 sequentially executes the series of processing illustrated with reference codes S101 to S111 at predetermined periods unless an instruction on termination of the series of processing is given (S113, NO). Then, when receiving the instruction on termination of execution of the series of processing (S113, YES), the information processing apparatus 10 terminates the execution of the series of processing illustrated with reference codes S101 to S111.

Note that, part of the processing illustrated with reference codes S101 to S111 may be executed in parallel with another processing. As a specific example, the processing regarding recognition of the position or orientation of the viewpoint illustrated with reference code S101 can be sequentially executed even while the processing illustrated with reference codes S103 to S111 is being executed. As a result, the latest information can be used for the processing as the information regarding the position or orientation of the viewpoint at the execution timing of the processing (in particular, the processing S103, S105, and S107) illustrated with reference codes S103 to S111.

An example of the flow of the series of processing of the information processing system 1 according to the embodiment of the present disclosure has been described with reference to FIG. 11, in particular, focusing on the operation of the information processing apparatus 10 illustrated in FIG. 1.

<3.4. Modification>

Next, modifications of the information processing system according to the embodiment of the present disclosure will be described.

(Modification 1: An Example of Correction Control)

First, as modification 1, an example of the control of the correction (reprojection) of the display information according to the movement of an object will be described. The delay dt described with reference to FIG. 8 sometimes becomes larger due to a temporary increase in the load of at least a part of the processing described as "Scene update" and "drawing", for example. In such a situation where the delay dt becomes larger, an error of the presumption result of the changes according to the movement of the object (for example, the changes in the position, orientation, size, color, brightness, and the like of the object) sometimes becomes larger. As a specific example, when the delay dt becomes larger in a situation where a locus of the movement of the object has a curvature, there may be a gap between the original locus of the movement of the object and the presumed locus of the movement of the object. Furthermore, as another example, in a case where the movement of the object suddenly changes, so-called overshoot or the like occurs, and there may be a gap between the original locus of the movement of the object and the presumed locus of the movement of the object. There is a possibility that the influence associated with the sudden change in the movement of the object becomes larger as the delay dt becomes larger, for example.

In view of such a situation, the processing regarding correction of the display information may be temporarily suppressed in the case where the calculation result of the delay dt has suddenly changed, for example.

As a specific example, application of the correction of the display information may be temporarily suppressed in a case where a difference between the delays dt calculated at different timings from each other has exceeded a threshold. With such control, in a case where the calculation result of the delay dt temporarily increases with an increase in the processing load or the like, and the application amount of the correction of the display information temporarily increases, application of the correction is suppressed, so that application of the correction by which the movement of the display information (that is, the movement of the object) suddenly changes can be suppressed, for example.

Furthermore, as another example, a moving average dt_avg of the delays dt may be used at the time of correcting the display information. More specifically, at the time of correcting the display information, the correction may be controlled on the basis of a difference between the delay dt calculated at the timing of the correction and the moving average dt_avg of the delays dt up to the timing (that is, dt−dt_avg). With such control, even in the case where the calculation result of the delay dt temporarily increases with an increase in the processing load or the like, the application amount of the correction of the display information is suppressed, and application of the correction by which the movement of the display information (that is, the movement of the object) suddenly changes can be suppressed.

As the modification 1, an example of the control of the correction (reprojection) of the display information according to the movement of an object has been described.

(Modification 2: An Example of Correction Application Unit)

Next, as modification 2, an example of an application unit for correcting display information will be described. In the above-described embodiment, an example in which the correction of the display information according to the projection result of the object is applied for each object has been described. In contrast, in the modification 2, an example of a case where the target object is divided into a plurality of parts, and the correction of the display information according to the projection result of the object is applied for each divided part will be described.

As a specific example, the correction may be applied to the display information according to the projection result of the object for each unit data (for example, pixels) constituting the display information. In this case, the information regarding the movement of the target object (that is, information regarding movement of a part corresponding to the pixels constituting the display information) may be acquired for each part (for example, a voxel) of the object. Thereby, the correction (reprojection) can be applied for each pixels constituting the display information.

Furthermore, as another example, the information regarding the movement of the object (that is, information regarding movement of a part corresponding to an edge) may be acquired for each edge of the object. In this case, for example, the correction (reprojection) may be applied on the basis of the information regarding the movement of the object acquired for the edge, for the part corresponding to the edge of the target object of the display information according to the projection result of the object.

As described above, the movement of the object can be more finely reproduced by dividing the target object into a plurality of parts, and applying the correction of the display information according to the projection result of the object for each divided part.

Note that the above-description is a mere example and does not necessarily limit the operation of the information processing system according to the modification 2. That is, the unit of dividing the target object (in other words, the unit for which the correction is applied) is not particularly limited as long as the object can be divided into a plurality of parts, and the correction of the display information according to the projection result of the object can be applied for each divided part.

An example of the application unit for correcting display information has been described as the modification 2.

4. Hardware Configuration

Next, an example of a hardware configuration of the information processing apparatus 10 that configures the information processing system according to the present embodiment will be described.

<4.1. Configuration Example as Independently Operable Device>

Figure 12:
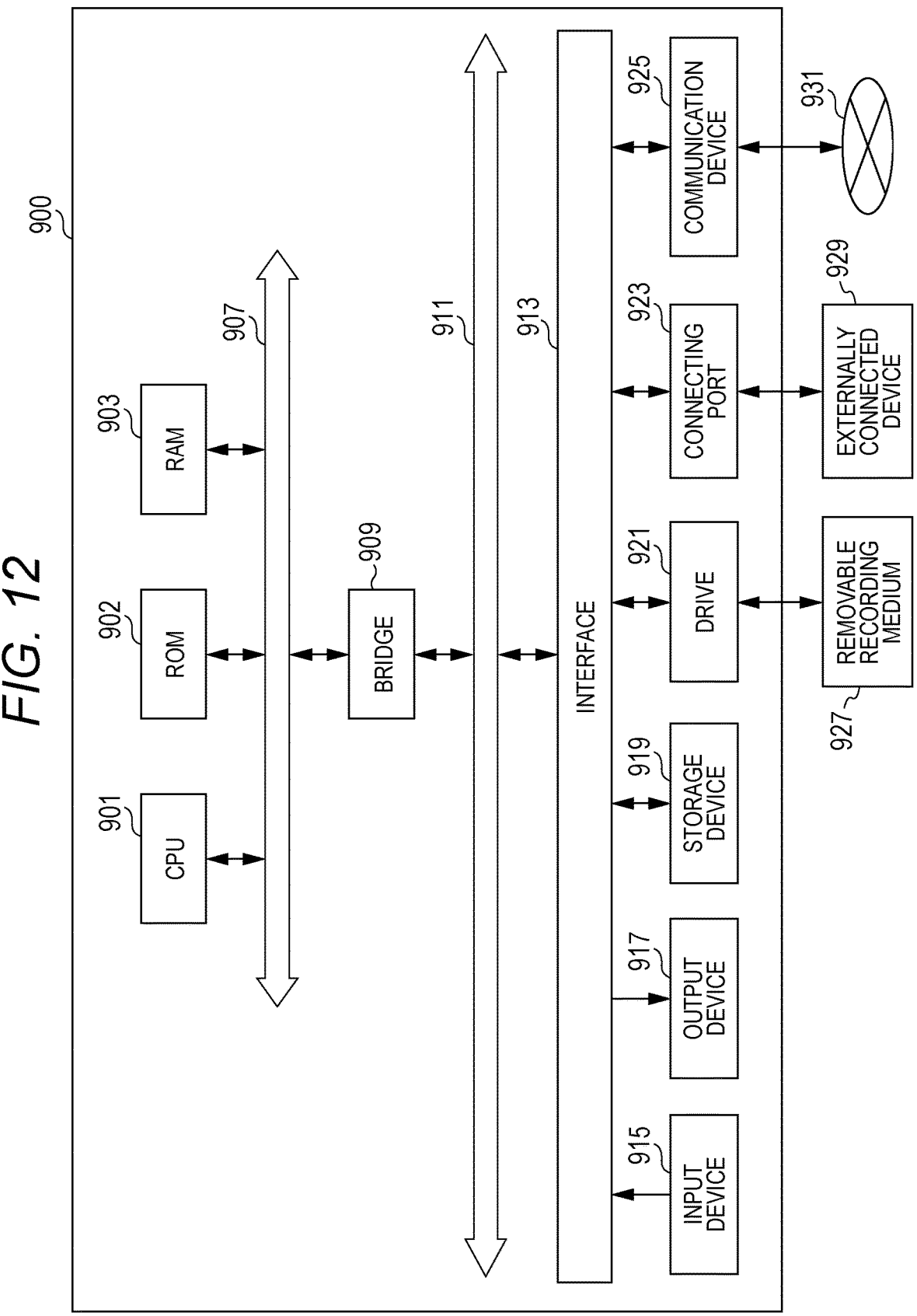
FIG. 12 is a functional block diagram illustrating an example of a hardware configuration of an information processing apparatus configuring the information processing system according to the embodiment of the present disclosure.

First, an example of a hardware configuration of an information processing apparatus 900 in a case where the configuration corresponding to the above-described information processing apparatus 10 is implemented as an independently operable device such as a PC, a smartphone, or a server (which will be referred to as the "information processing apparatus 900" for convenience) will be described in detail with reference to FIG. 12. FIG. 12 is a functional block diagram illustrating an example of a hardware configuration of the information processing apparatus 900 configuring the information processing system according to the embodiment of the present disclosure.

The information processing apparatus 900 configuring the information processing system 1 according to the present embodiment mainly includes a CPU 901, a ROM 902, and a RAM 903. Furthermore, the information processing apparatus 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls general operation or part thereof of the information processing apparatus 900 according to various programs recorded in the ROM 902, the RAM 903, the storage device 919, or a removable recording medium 927. The ROM 902 stores programs, arithmetic operation parameters, and the like used by the CPU 901. The RAM 903 primarily stores the programs used by the CPU 901, parameters that appropriately change in execution of the programs, and the like. The CPU 901, the ROM 902, and the RAM 903 are mutually connected by the host bus 907 configured by an internal bus such as a CPU bus. Note that the recognition processing unit 101, the calculation unit 103, the drawing processing unit 105, the correction processing unit 107, and the output control unit 109 described with reference to FIG. 11 can be implemented by the CPU 901, for example.

The host bus 907 is connected to the external bus 911 such as a peripheral component interconnect/interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation unit operated by the user, such as a mouse, a keyboard, a touch panel, a button, a switch, a lever, and a pedal, for example. Furthermore, the input device 915 may be, for example, a remote control unit (so-called remote controller) using infrared rays or other radio waves or an externally connected device 929 such as a mobile phone or a PDA corresponding to an operation of the information processing apparatus 900. Moreover, the input device 915 is configured by, for example, an input control circuit for generating an input signal on the basis of information input by the user using the above-described operation unit and outputting the input signal to the CPU 901, or the like. The user of the information processing apparatus 900 can input various data and give an instruction on processing operations to the information processing apparatus 900 by operating the input device 915.

The output device 917 is configured by a device that can visually or audibly notify the user of acquired information. Examples of such devices include display devices such as a CRT display device, a liquid crystal display device, a plasma display device, an EL display device, a lamp, and the like, sound output devices such as a speaker and a headphone, and a printer device. The output device 917 outputs, for example, results obtained by various types of processing performed by the information processing apparatus 900. Specifically, the display device displays the results of the various types of processing performed by the information processing apparatus 900 as texts or images. Meanwhile, the sound output device converts an audio signal including reproduced sound data, voice data, or the like into an analog signal and outputs the analog signal. Note that the output unit 211 described with reference to FIG. 11 can be implemented by the output device 917, for example.

The storage device 919 is a device for data storage configured as an example of a storage unit of the information processing apparatus 900. The storage device 919 is configured by a magnetic storage device such as a hard disk drive (HDD), a semiconductor storage device, an optical storage device, a magneto-optical storage device, or the like, for example. The storage device 919 stores programs executed by the CPU 901, various data, and the like.

The drive 921 is a reader/writer for a recording medium, and is built in or is externally attached to the information processing apparatus 900. The drive 921 reads out information recorded on the removable recording medium 927 such as a mounted magnetic disk, optical disk, magneto-optical disk, or semiconductor memory, and outputs the information to the RAM 903. Furthermore, the drive 921 can also write a record on the removable recording medium 927 such as the mounted magnetic disk, optical disk, magneto-optical disk, or semiconductor memory. The removable recording medium 927 is, for example, a DVD medium, an HD-DVD medium, a Blu-ray (registered trademark) medium, or the like. Furthermore, the removable recording medium 927 may be a compact flash (CF (registered trademark)), a flash memory, a secure digital (SD) memory card, or the like. Furthermore, the removable recording medium 927 may be, for example, an integrated circuit (IC) card on which a non-contact IC chip is mounted, an electronic device, or the like.

The connection port 923 is a port for being directly connected to the information processing apparatus 900. Examples of the connection port 923 include a universal serial bus (USB) port, an IEEE 1394 port, a small computer system interface (SCSI) port, and the like. Other examples of the connection port 923 include an RS-232C port, an optical audio terminal, a high-definition multimedia interface (HDMI) (registered trademark) port, and the like. By connecting the externally connected device 929 to the connection port 923, the information processing apparatus 900 directly acquires various data from the externally connected device 929 and provides various data to the externally connected device 929.

The communication device 925 is, for example, a communication interface configured by a communication device for being connected to a communication network (network) 931, and the like. The communication device 925 is, for example, a communication card for a wired or wireless local area network (LAN), Bluetooth (registered trademark), a wireless USB (WUSB), or the like. Furthermore, the communication device 925 may be a router for optical communication, a router for an asymmetric digital subscriber line (ADSL), a modem for various communications, or the like. The communication device 925 can transmit and receive signals and the like, for example, to and from the Internet and other communication devices in accordance with a predetermined protocol such as TCP/IP, for example. Furthermore, the communication network 931 connected to the communication device 925 is configured by a network or the like connected by wire or wirelessly, and may be, for example, the Internet, home LAN, infrared communication, radio wave communication, satellite communication, or the like.

An example of the hardware configuration that can implement the functions of the information processing apparatus 900 that configures the information processing system 1 according to the embodiment of the present disclosure has been described. Each of the above-described configuration elements may be configured using general-purpose members or may be configured by hardware specialized for the function of each configuration element. Therefore, the hardware configuration to be used can be changed as appropriate according to the technical level of the time of carrying out the present embodiment. Note that various configurations corresponding to the information processing apparatus 900 configuring the information processing system 1 according to the present embodiment are naturally provided although not illustrated in FIG. 12.

Note that a computer program for implementing the functions of the information processing apparatus 900 configuring the information processing system 1 according to the above-described present embodiment can be prepared and implemented on a personal computer or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium. Furthermore, the number of computers that execute the computer program is not particularly limited. For example, a plurality of computers (for example, a plurality of servers or the like) may execute the computer program in cooperation with one another. Note that a single computer or a plurality of computers cooperating with one another is also referred to as a "computer system".

An example of the hardware configuration of the information processing apparatus 900 in the case of implementing the configuration corresponding to the above-described information processing apparatus 10 as the independently operable information processing apparatus 900 such as a PC, a smartphone, or a server has been described in detail with reference to FIG. 12.

<4.2. Configuration Example when Implementing Information Processing Apparatus as Chip>

Figure 13:
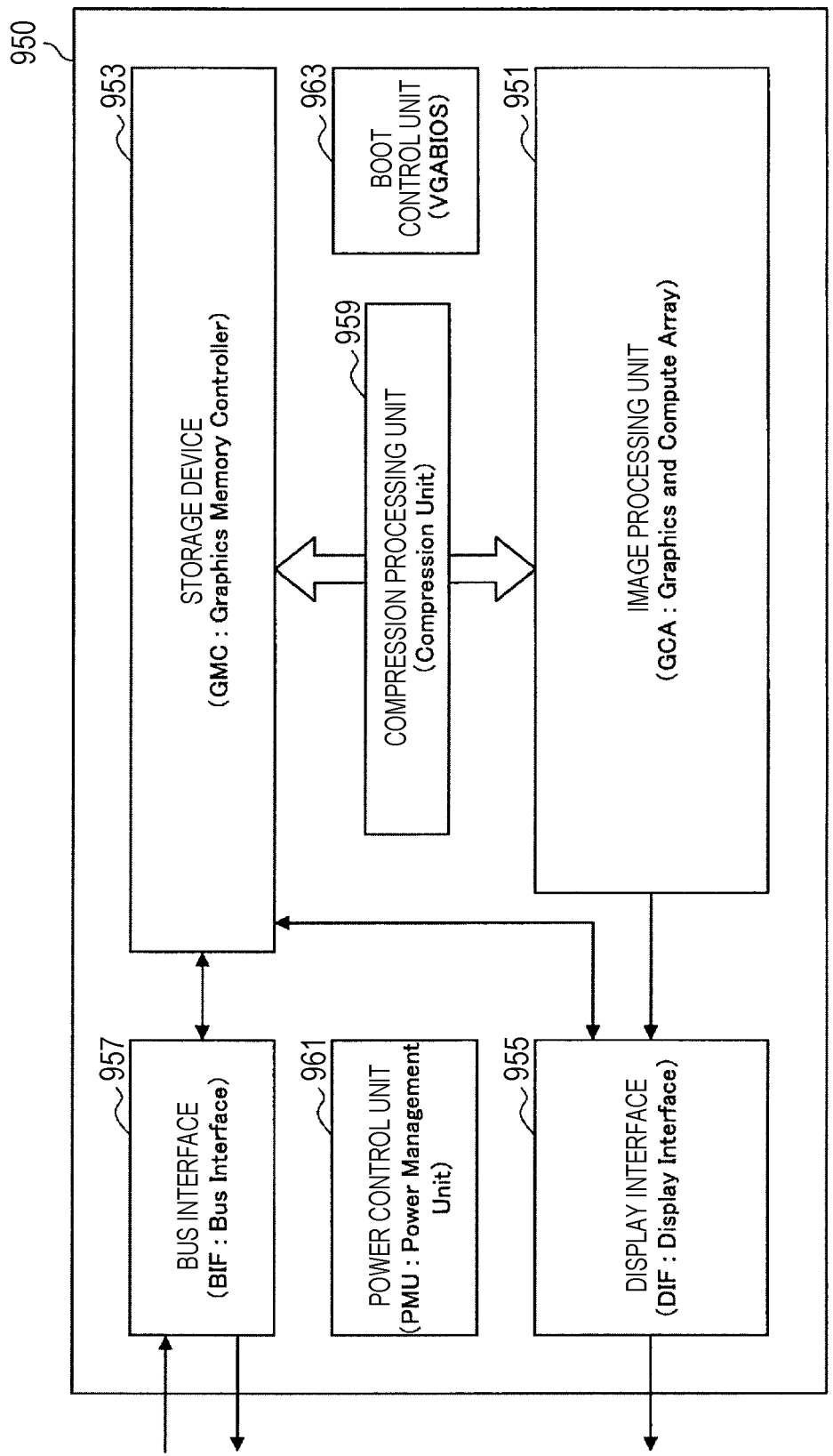
FIG. 13 is a functional block diagram illustrating an example of a hardware configuration in a case where the information processing apparatus configuring the information processing system according to the embodiment of the present disclosure is implemented as a chip.

Next, an example of a hardware configuration of a chip 950 in the case of implementing the configuration corresponding to the above-described information processing apparatus 10 as a chip such as a GPU (which will be referred to as the "chip 950" for convenience) will be described in detail with reference to FIG. 13. FIG. 13 is a functional block diagram illustrating an example of a hardware configuration in the case of implementing the information processing apparatus configuring the information processing system according to the embodiment of the present disclosure as a chip.

As illustrated in FIG. 13, the chip 950 includes an image processing unit (graphics and compute array: GCA) 951, a storage device (graphics memory controller: GMC) 953, a display interface (DIF) 955, a bus interface (BIF) 957, a power control unit (power management unit: PMU) 961, and a boot control unit (VGABIOS) 963. Furthermore, a compression processing unit (compression unit) 959 may be interposed between the image processing unit 951 and the storage device 953.

The image processing unit 951 corresponds to a processor that executes various types of processing regarding image processing. As a specific example, the image processing unit 951 executes various types of calculation processing such as the above-described processing regarding projecting an object, processing regarding drawing the display information according to the projection result, and processing regarding correcting the display information such as reprojection. Furthermore, at this time, the image processing unit 951 may read data stored in the storage device 953 and use the data for execution of the various types of arithmetic processing. Note that the processing of the recognition processing unit 101, the calculation unit 103, the drawing processing unit 105, the correction processing unit 107, and the output control unit 109, which has been described with reference to FIG. 11, can be implemented by the calculation processing by the image processing unit 951, for example.

The storage device 953 is a configuration for temporarily or permanently storing various data. As a specific example, the storage device 953 may store data according to execution results of the various types of arithmetic processing by the image processing unit 951. The storage device 953 can be implemented on the basis of a technology of video RAM (VRAM), window RAM (WRAM), multibank DRAM (MDRAM), double-data-rate (DDR), graphics DDR (GDDR), high bandwidth memory (HBM), or the like, for example.

The compression processing unit 959 compresses and decompresses various data. As a specific example, the compression processing unit 959 may compress data according to a calculation result by the image processing unit 951 when the data is stored in the storage device 953. Furthermore, when the image processing unit 951 reads data stored in the storage device 953, the compression processing unit 959 may decompress the data in the case where the data is compressed.

The display interface 955 is an interface for the chip 950 to send and receive data to and from a display (for example, the output unit 211 illustrated in FIG. 11). As a specific example, a result of drawing of the display information by the image processing unit 951 is output to the display via the display interface 955. Further, as another example, in the case where the result of drawing of the display information by the image processing unit 951 is stored in the storage device 953, the result of the drawing stored in the storage device 953 is output to the display via the display interface 955.

The bus interface 957 is an interface for the chip 950 to send and receive data to and from other devices and external devices. As a specific example, the data stored in the storage device 953 is transmitted to another device or an external device via the bus interface 957. Furthermore, data transmitted from another device or an external device is input to the chip 950 via the bus interface 957. Note that the data input to the chip 950 is stored in the storage device 953, for example.

The power control unit 961 is a configuration for controlling supply of power to each part of the chip 950.

The boot control unit 963 is a configuration for managing and controlling various types of processing related to boot, input/output of various types of information, and the like at the time of booting the chip 950. The boot control unit 963 corresponds to a so-called video graphics array basic input/output system (VGABIOS).

An example of the hardware configuration of the chip 950 in the case of implementing the configuration corresponding to the above-described information processing apparatus 10 as the chip 950 such as a GPU has been described in detail with reference to FIG. 13. Note that, in the present disclosure, the case of implementing the configuration as the "information processing apparatus" can include the case of implementing the configuration as a chip (in other words, components) to be incorporated in a device, as illustrated in FIG. 13, in addition to the case of implementing the configuration as one device, as illustrated in FIG. 12.

5. Conclusion

As described above, in the information processing system according to an embodiment of the present disclosure, the information processing apparatus includes the acquisition unit that acquires the information regarding the movement of the object, and the control unit that corrects the display information according to the projection result of the object. The control unit projects the object in the display region at the projection timing set according to the timing for each first period, and corrects the display information according to the result of the projection in accordance with the display timing set for each second period shorter than the first period. Furthermore, the control unit controls the correction of the second display information to maintain the continuity according to the movement of the object between the first display information displayed according to the first projection result of the object in accordance with the first display timing and the second display information displayed according to the second projection result of the object in accordance with the second display timing immediately after the first display timing.

With the above configuration, the information processing system according to the present embodiment can suppress the situation in which the display information is presented as if a portion where the movement of the object is discontinuous has occurred from becoming apparent in presenting the object having movement as the display information. That is, the information processing system according to an embodiment of the present disclosure can present a video in which the movement of an object to be presented is shown in a more natural manner, even under the situation where the object has movement.

Note that the above description has focused on the case where the technology according to the embodiment of the present disclosure is applied to the head-mounted device to which the transmission-type display is applied as the output unit. However, the application of the technology is not necessarily limited. That is, the technique according to the present disclosure can be applied in the case of complementing the movement of the object by the correction of the display information in a situation where the position or orientation of the viewpoint and the autonomous movement of the object may irregularly change, or in a situation where the length of the processing of drawing the object as the display information may irregularly change.

As a more specific example, in the above-described embodiment, the description has been given focusing on the case where the information is mainly presented on the basis of the AR technology. However, a blur of the video (in other words, the situation where the display information is presented as if a portion where the movement of the object is discontinuous has occurred) can be suppressed from becoming apparent, even in a case where the information is presented on the basis of a VR technology by applying the present technology. Furthermore, as another example, the blur of the video can be suppressed from becoming apparent by applying the present technology even in a situation where upsampling is performed when the video such as a moving image transferred via a network is presented via a television receiver.

Note that, as the situation where the autonomous movement of the object may irregularly change, a situation in which some information of a video lacks due to a load of the network in the situation where the video is transferred via the network, and the autonomous movement of the object irregularly changes accordingly, can be assumed, for example. Furthermore, as the situation where the length of the processing of drawing the object as the display information may irregularly change, a situation where a frame is dropped with an increase in a processing load of a device on the reproduction side in a case where a codec by which a load on decoding of a moving image can vary is applied, can be assumed, for example.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

An information processing apparatus including:

an acquisition unit configured to acquire information regarding movement of an object; and a control unit configured to project the object in a display region at a projection timing set according to a first period, and correct display information according to a result of the projection in accordance with display timings each set for each second period shorter than the first period, in which the control unit controls correction of second display information to maintain continuity according to the movement of the object between first display information displayed according to a first projection result of the object in accordance with a first display timing, and the second display information displayed according to a second projection result of the object in accordance with a second display timing immediately after the first display timing.

(2)

The information processing apparatus according to (1), in which the control unit controls the correction of the second display information such that a difference between the first display information and the second display information substantially coincides with a change in a component related to the correction among changes according to the movement of the object between the first display timing and the second display timing.

(3)

The information processing apparatus according to (2), in which the component related to the correction includes at least one of a position of the display information, an orientation of the display information, or a size of the display information.

(4)

The information processing apparatus according to (2) or (3), in which the control unit corrects a position of the second display information in the display region such that a change in a position between the first display information and the second display information in the display region, and a change in a position of the object with respect to a viewpoint between the first display timing and the second display timing according to the movement of the object substantially coincide with each other.

(5)

The information processing apparatus according to any one of (1) to (4), in which the control unit controls the correction of the second display information on the basis of a delay according to a timing at which the movement of the object corresponding to the second projection result has been determined and the second display timing, and the movement of the object.

(6)

The information processing apparatus according to (5), in which the delay is a period according to the timing at which the movement of the object corresponding to the second projection result has been determined and a timing at which the correction is applied to the second display information.

(7)

The information processing apparatus according to (6), in which the control unit calculates a moving average of the delay determined for each timing at which the correction is applied, and controls the correction of the second display information on the basis of a difference between the delay and a calculation result of the moving average.

(8)

The information processing apparatus according to (6) or (7), in which the control unit suppresses application of the correction in a case where a different between the delays determined for different timings from each other among the timings at which the correction is applied exceeds a threshold.

(9)

The information processing apparatus according to any one of (5) to (8), in which the movement of the object is determined according to a positional relationship between a viewpoint and the object.

(10)

The information processing apparatus according to any one of (5) to (9), in which the timing at which the movement of the object has been determined is a timing at which a scene graph regarding the object is determined.

(11)

The information processing apparatus according to any one of (1) to (10), in which the control unit acquires the second projection result by projecting the object in the display region at the projection timing set according to a timing after the first projection result has been acquired among timings each set for each of the first periods.

(12)

The information processing apparatus according to any one of (1) to (11), in which the projection timing is set as a timing after processing regarding determination of the movement of the object is completed, the processing having been executed at a timing after the result of the previous projection is acquired as a starting point among timings each set for each of the first periods.

(13)

The information processing apparatus according to any one of (1) to (12), in which the information regarding movement of an object includes information regarding at least one of a moving direction, a speed, an acceleration, or an angular velocity of the object.

(14)

The information processing apparatus according to any one of (1) to (13), in which the acquisition unit acquires the information regarding movement of the object for each part of the object, and the control unit controls the correction of the display information according to a projection result of the object on the basis of the information corresponding to the part, for each part of the object.

(15)

The information processing apparatus according to (1), in which the display region is a display region of a head-mounted display, the object is a virtual object that autonomously moves in a real space, the first period is a period regarding determination or update of a scene graph of an augmented reality application, and the control unit performs reprojection processing for the virtual object projected in the display region, for each of the display timings, on the basis of a change in position and orientation of a viewpoint of the head-mounted display, as the correction of the display information.

(16)

The information processing apparatus according to (15), in which the projection timing includes a first projection timing and a second projection timing after the first projection timing, the first display information is display information corresponding to the first projection timing, the second display information is display information corresponding to the second projection timing, and the control unit determines a position of the second display information on the basis of the first display information for which the reprojection processing has been performed in accordance with the first display timing immediately before the second display timing.

(17)

The information processing apparatus according to (16), in which the control unit determines the position of the second display information on the basis of a timestamp of the first display information for which the reprojection processing has been performed.

(18)

An information processing method including:

by a computer, acquiring information regarding movement of an object; and projecting the object in a display region at a projection timing set according to a timing for each first period, and correcting display information according to a result of the projection in accordance with a display timing set for each second period shorter than the first period, in which correction of second display information is controlled to maintain continuity according to the movement of the object between first display information displayed according to a first projection result of the object in accordance with a first display timing, and the second display information displayed according to a second projection result of the object in accordance with a second display timing immediately after the first display timing.

(19)

A storage medium recording a program for causing a computer to execute:

acquiring information regarding movement of an object; and projecting the object in a display region at a projection timing set according to a timing set for each first period, and correcting display information according to a result of the projection in accordance with a display timing set for each second period shorter than the first period, in which correction of second display information is controlled to maintain continuity according to the movement of the object between first display information displayed according to a first projection result of the object in accordance with a first display timing, and the second display information displayed according to a second projection result of the object in accordance with a second display timing immediately after the first display timing.

(20)

An information processing apparatus including:

an acquisition unit configured to acquire first information regarding movement of an object, and second information regarding a first timing at which the movement of the object has been determined; and a control unit configured to project the object to a display region on the basis of the first information and the second information, and perform control so that display information is presented in the display region according to a result of the projection, in which the control unit controls correction of the display information on the basis of a delay according to the first timing according to the second information and a second timing at which the display information is presented in the display region, and the movement of the object according to the first information.

(21)

An information processing method including:

by a computer, acquiring first information regarding movement of an object, and second information regarding a first timing at which the movement of the object has been determined; and projecting the object to a display region on the basis of the first information and the second information, and performing control so that display information is presented in the display region according to a result of the projection, in which correction of the display information is controlled on the basis of a delay according to the first timing according to the second information and a second timing at which the display information is presented in the display region, and the movement of the object according to the first information.

(22)

A storage medium recording a program for causing a computer to execute:

acquiring first information regarding movement of an object, and second information regarding a first timing at which the movement of the object has been determined; and projecting the object to a display region on the basis of the first information and the second information, and performing control so that display information is presented in the display region according to a result of the projection, in which correction of the display information is controlled on the basis of a delay according to the first timing according to the second information and a second timing at which the display information is presented in the display region, and the movement of the object according to the first information.

REFERENCE SIGNS LIST

1 Information processing system
10 Information processing apparatus
101 Recognition processing unit
103 Calculation unit
105 Drawing processing unit
107 Correction processing unit
109 Output control unit
20 Input/output device
201 Imaging unit
207 Operation unit
211 Output unit
251 Detection unit

The invention claimed is:

1. An information processing apparatus comprising:
an acquisition unit configured to acquire information regarding movement of an object; and
a control unit configured to
project the object in a display region at a projection timing set according to a first frequency, and correct display information according to a result of the projection in accordance with a plurality of display timings each set according to a second frequency larger than the first frequency,
control correction of second display information displayed at the second frequency to maintain continuity according to the movement of the object between
first display information displayed according to a first projection result of the object in accordance with a first display timing at the second frequency, the first projection result of the object being displayed according to the first frequency, and
the second display information displayed according to a second projection result of the object in accordance with a second display timing at the second frequency immediately after the first display timing, the second projection result of the object being displayed at the first frequency, and
control the correction of the second display information on a basis of
a delay according to a timing at the first frequency at which the movement of the object corresponding to the second projection result has been determined and the second display timing at the second frequency, and
the movement of the object,
wherein the acquisition unit and the control unit are each implemented via at least one processor.

2. The information processing apparatus according to claim 1, wherein the control unit is further configured to control the correction of the second display information such that a difference between the first display information and the second display information substantially coincides with a change in a component related to the correction among changes according to the movement of the object between the first display timing and the second display timing.

3. The information processing apparatus according to claim 2, wherein the component related to the correction includes at least one of a position of the display information, an orientation of the display information, or a size of the display information.

4. The information processing apparatus according to claim 2, wherein
the control unit is further configured to correct a position of the second display information in the display region such that
a change in a position between the first display information and the second display information in the display region, and
a change in a position of the object with respect to a viewpoint between the first display timing and the second display timing according to the movement of the object
substantially coincide with each other.

5. The information processing apparatus according to claim 1, wherein the delay is a period according to
the timing at which the movement of the object corresponding to the second projection result has been determined, and
a timing at which the correction is applied to the second display information.

6. The information processing apparatus according to claim 5, wherein the control unit is further configured to
calculate a moving average of the delay determined for each timing at which the correction is applied, and
control the correction of the second display information on a basis of a difference between the delay and a calculation result of the moving average.

7. The information processing apparatus according to claim 5, wherein the control unit is further configured to suppress application of the correction in a case where a difference between the delays determined for different timings from each other among the timings at which the correction is applied exceeds a threshold.

8. The information processing apparatus according to claim 1, wherein the movement of the object is determined according to a positional relationship between a viewpoint and the object.

9. The information processing apparatus according to claim 1, wherein the timing at which the movement of the object has been determined is a timing at which a scene graph regarding the object is determined.

10. The information processing apparatus according to claim 1, wherein the control unit is further configured to acquire the second projection result by projecting the object in the display region at the projection timing set according to a timing after the first projection result has been acquired among timings each set according to the first frequency.

11. The information processing apparatus according to claim 1, wherein the projection timing is set as a timing after processing regarding determination of the movement of the object is completed, the processing having been executed at a timing after the result of a previous projection is acquired as a starting point among timings each set according to the first frequency.

12. The information processing apparatus according to claim 1, wherein the information regarding movement of an object includes information regarding at least one of a moving direction, a speed, an acceleration, or an angular velocity of the object.

13. The information processing apparatus according to claim 1, wherein the acquisition unit is further configured to acquire the information regarding movement of the object for each part of the object, and
the control unit is further configured to control the correction of the display information according to a projection result of the object on a basis of the information corresponding to the part, for each part of the object.

14. The information processing apparatus according to claim 1, wherein
the display region is a display region of a head-mounted display,
the object is a virtual object that autonomously moves in a real space,
the first frequency is a frequency regarding determination or update of a scene graph of an augmented reality application, and
the control unit is further configured to perform reprojection processing for the virtual object projected in the display region, for each of the display timings, on a basis of a change in position and orientation of a viewpoint of the head-mounted display, as the correction of the display information.

15. The information processing apparatus according to claim 14, wherein
the projection timing includes a first projection timing and a second projection timing after the first projection timing,
the first display information includes display information corresponding to the first projection timing,
the second display information includes display information corresponding to the second projection timing, and
the control unit is further configured to determine a position of the second display information on a basis of the first display information for which the reprojection processing has been performed in accordance with the first display timing immediately before the second display timing.

16. The information processing apparatus according to claim 15, wherein the control unit is further configured to determine the position of the second display information on a basis of a timestamp of the first display information for which the reprojection processing has been performed.

17. An information processing method comprising:
by a computer,
acquiring information regarding movement of an object;
projecting the object in a display region at a projection timing set according to a first frequency, and correcting display information according to a result of the projection in accordance with a plurality of display timings each set according to a second frequency larger than the first frequency;
controlling correction of second display information displayed at the second frequency to maintain continuity according to the movement of the object between
first display information displayed according to a first projection result of the object in accordance with a first display timing at the second frequency, the first projection result of the object being displayed according to the first frequency, and
the second display information displayed according to a second projection result of the object displayed at the first frequency in accordance with a second display timing at the second frequency immediately after the first display timing, the second projection result of the object being displayed at the first frequency; and controlling the correction of the second display information on a basis of
- a delay according to a timing at the first frequency at which the movement of the object corresponding to the second projection result has been determined and the second display timing at the second frequency, and
- the movement of the object.

18. A non-transitory computer-readable medium having embodied thereon a program, which when executed by a computer causes the computer to execute an information processing method, the method comprising:

acquiring information regarding movement of an object;

projecting the object in a display region at a projection timing set according to a first frequency, and correcting display information according to a result of the projection in accordance with a plurality of display timings each set according to a second frequency larger than the first frequency;

controlling correction of second display information displayed at the second frequency to maintain continuity according to the movement of the object between first display information displayed according to a first projection result of the object in accordance with a first display timing at the second frequency, the first projection result of the object being displayed according to the first frequency, and the second display information displayed according to a second projection result of the object in accordance with a second display timing at the second frequency immediately after the first display timing, the second projection result of the object being displayed at the first frequency; and controlling the correction of the second display information on a basis of
- a delay according to a timing at the first frequency at which the movement of the object corresponding to the second projection result has been determined and the second display timing at the second frequency, and
- the movement of the object.

* * * * *